(12) United States Patent
Li et al.

(10) Patent No.: US 10,477,245 B2
(45) Date of Patent: Nov. 12, 2019

(54) METHODS AND DEVICES FOR CODING AND DECODING DEPTH INFORMATION, AND VIDEO PROCESSING AND PLAYING DEVICE

(71) Applicant: ZTE Corporation, Shenzhen, Guangdong (CN)

(72) Inventors: Ming Li, Shenzhen (CN); Ping Wu, Shenzhen (CN); Hongwei Li, Shenzhen (CN); Guoqiang Shang, Shenzhen (CN); Yutang Xie, Shenzhen (CN)

(73) Assignee: ZTE CORPORATION (CN)

( * ) Notice: Subject to any disclaimer, the term of this patent is extended or adjusted under 35 U.S.C. 154(b) by 65 days.

(21) Appl. No.: 14/779,308

(22) PCT Filed: Feb. 25, 2014

(86) PCT No.: PCT/CN2014/072490
§ 371 (c)(1),
(2) Date: Oct. 27, 2015

(87) PCT Pub. No.: WO2014/154074
PCT Pub. Date: Oct. 2, 2014

(65) Prior Publication Data
US 2016/0057452 A1 Feb. 25, 2016

(30) Foreign Application Priority Data
Mar. 27, 2013 (CN) .......................... 2013 1 0102168

(51) Int. Cl.
*H04N 19/597* (2014.01)
*H04N 13/161* (2018.01)
(Continued)

(52) U.S. Cl.
CPC ......... *H04N 19/597* (2014.11); *H04N 13/161* (2018.05); *H04N 19/44* (2014.11); *H04N 19/91* (2014.11)

(58) Field of Classification Search
CPC ..................................................... H04N 19/597
(Continued)

(56) References Cited

U.S. PATENT DOCUMENTS 8,553,998 B1 * 10/2013 Hernandez Esteban ..................... H04N 19/597
382/232
8,620,099 B2 12/2013 Sim
(Continued)

FOREIGN PATENT DOCUMENTS

CN 101292255 A 10/2008
CN 101465004 A 6/2009
(Continued)

OTHER PUBLICATIONS

3D-CE6.h—Simplified Depth Coding with an optional Depth Lookup Table; Jager et al; Oct. 19, 2012.*
(Continued)

*Primary Examiner* — Luis Perez-Fuentes
(74) *Attorney, Agent, or Firm* — McDonald Hopkins LLC

(57) ABSTRACT

Disclosed are methods and devices for coding and decoding depth information, which relate to a Three-Dimensional Video (3DV) coding technology. The coding method includes: arranging all elements in a DLT in an ascending order of values, wherein the DLT is a data structure representing depth numerical values by index numbers; coding a value of a first element in the DLT, and writing the bits of the value into a bitstream; and coding a difference value between a value of each of the other elements except the first element in the DLT and a value of an element with an index
(Continued)

number smaller than an index number of the each of other elements in the DLT respectively, and writing the value of the difference value into the bitstream. The method for decoding depth information and related coding and decoding devices are also provided. By the technical solutions of the disclosure, efficiency of coding and decoding depth information is improved, and resource occupation during depth information coding is reduced.

6 Claims, 10 Drawing Sheets

(51) Int. Cl.
    *H04N 19/44*     (2014.01)
    *H04N 19/91*     (2014.01)

(58) Field of Classification Search
    USPC .................................................. 375/240.12
    See application file for complete search history.

(56) References Cited

U.S. PATENT DOCUMENTS

| | | | |
|---|---|---|---|
| 9,497,473 B2* | 11/2016 | Pu ........................... | H04N 19/50 |
| 2009/0161989 A1 | 6/2009 | Sim | |
| 2010/0103168 A1* | 4/2010 | Jung ....................... | G06T 15/005 |
| | | | 345/419 |
| 2012/0008676 A1* | 1/2012 | Lee ........................ | H04N 19/137 |
| | | | 375/240.02 |
| 2013/0156099 A1 | 6/2013 | Sasai | |
| 2013/0222377 A1 | 8/2013 | Bruls | |
| 2014/0198179 A1* | 7/2014 | Gu ......................... | H04N 19/597 |
| | | | 348/43 |
| 2014/0253682 A1* | 9/2014 | Zhang ................... | H04N 19/597 |
| | | | 348/43 |
| 2015/0063464 A1* | 3/2015 | Chen ....................... | H04N 19/50 |
| | | | 375/240.25 |
| 2015/0350623 A1* | 12/2015 | Zhang ................... | H04N 19/597 |
| | | | 375/240.12 |
| 2015/0350677 A1* | 12/2015 | Lim ...................... | H04N 19/463 |
| | | | 375/240.12 |
| 2016/0007005 A1* | 1/2016 | Konieczny ........... | H04N 19/597 |
| | | | 348/43 |
| 2016/0029036 A1* | 1/2016 | Jaeger .................. | H04N 19/597 |
| | | | 375/240.12 |
| 2016/0029038 A1* | 1/2016 | Zhao .................... | H04N 19/119 |
| | | | 375/240.12 |
| 2016/0050439 A1* | 2/2016 | Li ........................ | H04N 19/597 |
| | | | 375/240.12 |
| 2016/0227248 A1* | 8/2016 | Choi ..................... | H04N 19/29 |
| 2016/0255371 A1* | 9/2016 | Heo ..................... | H04N 19/597 |

FOREIGN PATENT DOCUMENTS

| | | | |
|---|---|---|---|
| CN | 101589625 A | | 11/2009 |
| CN | 101751897 A | | 6/2010 |
| CN | 102970548 A | | 3/2013 |
| JP | H1117971 A | | 1/1999 |
| JP | 2002044662 A | | 2/2002 |
| JP | 2016514426 A | | 5/2016 |
| WO | 2012042890 A1 | | 4/2012 |
| WO | 2012059841 A1 | | 5/2012 |
| WO | 2014108088 A | | 7/2014 |
| WO | 2014138224 A2 | | 9/2014 |

OTHER PUBLICATIONS

AHG7—Differential Coding method for DLT in 3D-HEVC; Zhang et al; Nov. 2013.*
3D-CE6.h—Simplified Depth Coding with an optional Depth Lookup Table; Jager—Oct. 19, 2012.*
Simplified Depth Coding with an optional Depth Lookup Table; Jager—Oct. 19, 2012.*
AHG7—Differential Coding method for DLT in 3D-HEVC; Nov. 2013.*
AHG7—On signaling of DLT for Depth coding; Zhao—Jul. 27, 2013.*
CE6.h—On signaling of DLT for depth coding; Zhao; Aug. 2013.*
NPL Google Search; (Year: 2019).*
On signaling of DLT for depth coding; Zhao; Aug. 2013 (Year: 2013).*
Simplified Depth Coding with an optional Depth Lookup Table; Jager et al—Oct. 19, 2012; (Year: 2012).*
Supplementary European Search Report in European application No. 14774120.1, dated Feb. 25, 2016.
Fabian Jager (RWTH Aachen University): "3D-CE6.h Results on Simplified Depth Coding with an optional Depth Lookup Table",102. MPEG Meeting; Oct. 15, 2012-Oct. 19, 2012; Shanghai; (Motion Picture Expert Group or ISO/IEC JTC1/SC29/WG11), No. m26691, Oct. 16, 2012 (Oct. 16, 2012), XP030055024, * the whole document *, mailed on Oct. 16, 2012.
Li M et al: "AHG7 Related: Differential coding method for DLT in 3D-HEVC",5. JCT-3V Meeting; Jul. 27, 2013-Aug. 2, 2013; Vienna; (The Joint Collaborative Team on 3D Video Coding Extension Development of ISO/IEC JTC1/SC29/WG11 and ITU-T SG.16 ); URL: http://phenix.int-evry.fr/jct2/,,No. JCT3V-E0211-v2, Jul. 26, 2013 (Jul. 26, 2013), XP030131257, * the whole document *, mailed on Jul. 26, 2013.
Zhang L et al: "Test Model 6 of 3D-HEVC 1-16 and MV-HEVC". 6. JCT-3V Meeting; Oct. 25, 2013-Nov. 1, 2013; Geneva; (The Joint Collaborative Team on 3D Video Coding Extension Development of ISO/IEC JTC1/SC29/WG11 and ITU-T SG.16 ); URL: http://phenix.int-evry.fr/jct2/,, No. JCT3V-FI005. Dec. 16, 2013 (Dec. 16, 2013). XP030131735, * 2.3.4.1 Depth Lookup Table *, mailed on Dec. 16, 2013.
Zhao X et al: "AHG7: On signaling of DLT 1-16 for depth coding". 5. JCT-3V Meeting; Jul. 27, 2013-Aug. 2, 2013; Vienna; (The Joint Collaborative Team on 3D Video Coding Extension Development of ISO/IEC JTC1/SC29/WG11 and ITU-T SG.16 ); URL: http://phenix.int-evry.fr/jct2/, No. JCT3V-EOI30. Jul. 19, 2013 (Jul. 19, 2013), XP030131147, * the whole document *, mailed on Jul. 19, 2013.
International Search Report in international application No. PCT/CN2014/072490, dated May 5, 2014.
English Translation of the Written Opinion of the International Search Authority in international application No. PCT/CN2014/072490, dated May 5, 2014.
Kai Zhang, et al., 3D-CE6.h related: An efficient coding method for DLT in 3DVC, Joint Collaborative Team on 3D Video Coding Extension Development of ITU-T SG 16 WP 3 and ISO/IEC JTC 1/SC 29/WG 11 3rd Meeting: Geneva, CH, Jan. 17-23, 2013, Jan. 18, 2013 (Jan. 18, 2013), JCT3V-C0142, URL: http://phenix.it-sudparis.eu/jct2/doc_end_user/documents/3_Geneva/wg11/JCT3V-C0142-v2.zip.
Xin Zhao, et al., CE6.h related: On signaling of DLT for depth coding, Joint Collaborative Team on 3D Video Coding Extensions of ITU-T SG 16 WP 3 and ISO/IEC JTC1/SC 29/WG 11 4th Meeting: Incheon, KR, Apr. 20-26, 2013, Apr. 21, 2013 (Apr. 21, 2013), JCT3V-D0182, URL: http://phenix.it-sudparis.eu/jct2/doc_end_user/documents/4_Incheon/wg11/JCT3V-D0182-v2.zip.

* cited by examiner

METHODS AND DEVICES FOR CODING AND DECODING DEPTH INFORMATION, AND VIDEO PROCESSING AND PLAYING DEVICE

TECHNICAL FIELD

The embodiments of the disclosure relate to a three-dimensional video coding technology, and in particular to methods, devices, video processing and playing device for coding and decoding depth information.

BACKGROUND

In an HEVC three-dimensional extension framework of a High Efficiency Video Coding (HEVC) standard-compatible Three-Dimensional Video (3DV) coding standard 3D-HEVC which is being formulated, Simplified Depth Coding (SDC) can effectively improve the efficiency of coding depth information with less calculation complexity. In an SDC module of a coder, the value of an input depth sample may be mapped to an index number of the depth sample value by employing Depth Look-up Table (DLT), so that the bit depth of depth samples is reduced to bring further improvement to the overall coding efficiency. In addition, a coder needs to write the DLT into a bitstream.

The 3D-HEVC standard writes DLT information into a bitstream by virtue of a direct coding method, and a decoding process is as follows.

The decoding process is: for a depth component, a decoder parses a value of dlt_flag from an input bitstream at first; when the value of dlt_flag is equal to 1 (that is, DLT is used), the decoder further parses a value of num_depth_values_in_dlt, and then the decoder parses values (dlt_depth_value[i] [j]) of num_depth_values_in_dlt DLT elements.

Corresponding to the decoding process, a coding process is as follows.

The coding process is: when the depth component is coded, a coder writes dlt_flag into a bitstream at first; and when the value of dlt_flag is equal to 1 (that is, DLT is used), the coder writes the number of depth numerical values included in the DLT into the bitstream, and then the coder writes the value of each element (dlt_depth_value[i] [j]) in the DLT into the bitstream in sequence.

In order to improve coding efficiency of DLT information, a proposal document JCT3V-C0142 proposes a Range Constrained Bit Map (RCBM) method. According to the method, a minimum value and a maximum value (represented by a difference between the maximum value and the minimum value) in a DLT are coded at first, and then whether each depth value between the minimum value and the maximum value is in the DLT or not is represented by a bit map consisting of a series of one-bit flags.

A DLT decoding process for the RCBM method is as follows.

The decoding process is: for a depth component, a decoder parses a value of dlt_flag out from an input bitstream; and when the value of dlt_flag is equal to 1 (that is, DLT is used), the decoder parses a value of code_full_bit_depth_map_flag, when the value of code_full_bit_depth_map_flag is 0, the minimum depth sample value in the DLT is set to be 0 and the maximum depth sample value in the DLT is set to be the allowable maximum value (for example, when bit depth of depth sample is 8, the value is 255), and on the contrary, when the value of code_full_bit_depth_map_flag is 1, the decoder parses the minimum value of the depth sample and the difference between the maximum value and the minimum value in the DLT from the input bitstream, and sets the maximum value and the minimum value. Within the DLT value range indicated by the minimum value and the maximum value, the decoder parses flag bits indicating whether each value is included in the DLT or not within the value range, and adds depth sample values with flag bit values equal to "1" in the DLT array.

Corresponding to the decoding process, a coding process for the RCBM method is as follows.

The coding process is: when the depth component is coded, a coder writes dlt_flag into a bitstream at first; when the value of dlt_flag is equal to 1, the coder writes code_full_bit_depth_map_flag into the bitstream; when the value of code_full_bit_depth_map_flag is 0, the minimum depth sample value in the DLT is set to be 0, and the maximum depth sample value in the DLT is set to be the allowable maximum value (if the bit depth of depth sample is 8, the value is 255), and on the contrary, when the value of code_full_bit_depth_map_flag is 1, the coder writes the minimum value of the depth sample value and the difference between the maximum value and the minimum value in the DLT into the bitstream; for each depth sample value (not including the maximum value and the minimum value) in the range indicated by the maximum value and the minimum value, the coder writes identification information ("0" indicates exclusion from the DLT and "1" indicates inclusion in the DLT) indicating whether the depth sample values is included in the DLT or not into the bitstream.

The abovementioned two DLT coding and decoding methods have the following main limitations:

the existing methods for 3D-HEVC have the main shortcoming that a value of each element in a DLT is directly written into a bitstream without removing redundancy in data utilizing the correlation among the data elements in the DLT, which leads to excessive cost in DLT coding bits; in reference software HTM5.1 for 3D-HEVC, DLT information is signalled in Sequence Parameter Set (SPS); and a test shows that it takes a coder up to 65% of the overall bits for SPS to code the DLT information.

Although the RCBM method may effectively reduce cost of DLT information, the method needs to code a flag bit for each depth sample value between a minimum value and a maximum value to identify whether the depth value is included in a DLT or not, which would lead to much higher additional bit cost when there exist more non-DLT numerical values between the minimum value and the maximum value.

SUMMARY

The embodiment of the disclosure is intended to provide depth information coding and decoding methods and devices, so as to improve depth information coding efficiency.

In order to solve the technical problem, the embodiment of the disclosure discloses a method for coding depth information, which includes:

arranging all elements in a DLT in an ascending order of values, wherein the DLT is a data structure representing depth numerical values by index numbers;

coding a value of a first element in the DLT, and writing the bits of the first element into a bitstream; and coding a difference value between a value of each of other elements except the first element in the DLT and a value of an element with an index number smaller than an index number of the each of other elements in the DLT, and writing the bits of the difference value into the bitstream.

Preferably, the step of coding the difference value between the value of each of the other elements except the first element in the DLT and the value of the element with the index number smaller than the index number of the each of other elements in the DLT may include:

determining the difference value between the value of each of the other elements except the first element in the DLT and the values of the elements with the index number smaller than the index number of the each of other elements in the DLT, selecting a first entropy coding method to code the difference value when the difference value is smaller than or equal to a set threshold value, and selecting a second entropy coding method to code the difference value when the difference value is greater than the set threshold value.

Preferably, in the method, the set threshold value may be a preset fixed value, or may be a numerical value which is dynamically regulated in a coding process.

Preferably, in the method, the set threshold value may be set for the whole DLT, or may be set for the other elements except the first element in the DLT respectively.

Preferably, the method further may include:

writing bits if DLT information into the bitstream, wherein the DLT information includes information about the number of the elements in the DLT.

Preferably, the method further may include:

before coding the difference value, coding auxiliary information and writing the bits of the auxiliary information into the bitstream, wherein the auxiliary information is configured to identify which entropy coding method is used for coding the difference value.

The embodiment of the disclosure further discloses a method for decoding depth information, which includes:

decoding bits corresponding to a first element of a DLT in a bitstream to obtain a value of the first element, wherein the DLT is a data structure representing depth numerical values by index numbers;

decoding bits corresponding to a difference value between a value of each of other elements except the first element in the DLT and a value of an element with an index number smaller than an index number of the each of other elements to obtain the difference value; and performing addition operation on the obtained difference value and a value of a decoded element with an index number smaller than the index number of the each of other elements corresponding to the difference value in the DLT, and employing a sum value as the value of the each of other elements with the index number corresponding to the difference value in the DLT.

Preferably, the method further may include:

before the DLT is decoded, decoding DLT information which includes information about the number of the elements in the DLT.

Preferably, the method further may include:

before the bits corresponding to the difference value are decoded, decoding bits corresponding to auxiliary information of the difference value to obtain an entropy coding method for the difference value, and decoding the difference value according to an entropy decoding method corresponding to the entropy coding method for the difference value.

The embodiment of the disclosure further discloses a device for coding depth information, which includes:

a processing unit, configured to arrange all elements in a DLT in an ascending order of values;

a first coding unit, configured to code a value of a first element in the DLT, and write the bits of the value of the first element into a bitstream; and a second coding unit, configured to code a difference value between a value of each of other elements except the first element in the DLT and a value of an element with an index number smaller than an index number of the each of other elements in the DLT, and write bits of the difference value into the bitstream, wherein the DLT is a data structure representing depth numerical values by index numbers.

Preferably, the second coding unit in the device may be configured to determine the difference value between the value of each of the other elements except the first element in the DLT and the value of the element with the index number smaller than the index number of the each of other elements in the DLT, select a first entropy coding method to code the difference value when the difference value is smaller than or equal to a set threshold value, and select a second entropy coding method to code the difference value when the difference value is greater than the set threshold value.

Preferably, in the device, the set threshold value may be a preset fixed value, or may be a numerical value which is dynamically regulated in a coding process.

Preferably, in the device, the set threshold value may be set for the whole DLT, or may be set for the other elements except the first element in the DLT respectively.

Preferably, the first coding unit in the device may be further configured to write the bits of DLT information into the bitstream, wherein the DLT information includes information about the number of the elements in the DLT.

Preferably, the second coding unit in the device may be configured to, when the difference value is coded, code auxiliary information and write the bits of the auxiliary information into the bitstream, wherein the auxiliary information is configured to identify which entropy coding method is used for coding the difference value.

The embodiment of the disclosure further discloses a device for decoding depth information, which includes:

a first decoding unit, configured to decode bits corresponding to a first element of a DLT in a bitstream to obtain a value of the first element;

a second decoding unit, configured to decode bits corresponding to a difference value between a value of each of other elements except the first element in the DLT and a value of an element with an index number smaller than an index number of the each of other elements to obtain the difference value; and a processing unit, configured to perform addition operation on the obtained difference value and a value of a decoded element with an index number smaller than the index number of the each of other elements corresponding to the difference value in the DLT, and employ a sum value as the value of the each of other elements with the index number corresponding to the difference value in the DLT, wherein the DLT is a data structure representing depth numerical values by index numbers.

Preferably, the first decoding unit in the device may be configured to, before the DLT is decoded, decode DLT information which includes information about the number of the elements in the DLT.

Preferably, the second decoding unit in the device may be configured to, before the bits corresponding to the difference value are decoded, decode bits corresponding to auxiliary information of the difference value to obtain an entropy coding method for the difference value, and decode the difference value according to an entropy decoding method corresponding to the entropy coding method for the difference value.

The embodiment of the disclosure further discloses a video processing device, which includes:

a cache, configured to cache data to be coded; and a coder, configured to arrange all elements in a Depth Look-up Table (DLT) in the cached data in an ascending order of values, code a value of a first element in the DLT, write bits of the value of the first element into a bitstream, code a difference value between a value of each of other elements except the first element in the DLT and a value of an element with an index number smaller than an index number of the each of other elements in the DLT, and write bits of the difference value into the bitstream.

Preferably, the coder may be configured to determine the difference value between the value of each of the other elements except the first element in the DLT and the value of the element with the index number smaller than the index number of the each of other elements in the DLT, select a first entropy coding method to code the difference value when the difference value is smaller than or equal to a set threshold value, and select a second entropy coding method to code the difference value when the difference value is greater than the set threshold value.

Preferably, the set threshold value for the coder to refer to may be a preset fixed value, or may be a numerical value which is dynamically regulated in a coding process.

Preferably, the set threshold value for the coder to refer to may be set for the whole DLT, or may be set for the other elements except the first element in the DLT respectively.

Preferably, the coder may be configured to, when the difference value is coded, code auxiliary information and write the bits of the auxiliary information into the bitstream, wherein the auxiliary information is configured to identify which entropy coding method is used for coding the difference value.

The embodiment of the disclosure further discloses a video playing device, which includes:

a decoder, configured to decode bits corresponding to a first element of a Depth Look-up Table (DLT) in a received bitstream to obtain a value of the first element, decode bits corresponding to a difference value between a value of each of other elements except the first element in the DLT and a value of an element with an index number smaller than an index number of the each of other elements to obtain the difference value, perform addition operation on the obtained difference value and a value of a decoded element with an index number smaller than the index number of the each of other elements corresponding to the difference value in the DLT, and employ a sum value as the value of the each of other elements with the index number corresponding to the difference value in the DLT; and a display, configured to display data decoded by the decoder.

Preferably, the decoder is configured to, before the bits corresponding to the difference value are decoded, decode bits corresponding to auxiliary information of the difference value to obtain an entropy coding method for the difference value, and decode the difference value according to an entropy decoding method corresponding to the entropy coding method for the difference value.

The embodiment of the disclosure further discloses a computer storage medium, in which computer-executable instructions are stored, wherein the computer-executable instructions are configured to execute the abovementioned methods.

By the technical solutions of the disclosure, efficiency of coding and decoding depth information is improved, and resource occupation during depth information coding is reduced.

DETAILED DESCRIPTION

In order to make clearer the purpose, technical solutions and advantages of the disclosure, the technical solutions of the disclosure are further described below with reference to the drawings in detail. It is important to note that the embodiments of the disclosure and characteristics in the embodiments can be freely combined under the condition of no conflicts.

The implementation method of a coder in each of the following embodiments is only one of possible implementation methods of a coder, and any coder capable of generating a bitstream meeting a requirement of a decoding process of the embodiment is an implementation method of a coder in the embodiment.

Embodiment 1

Figure 1:
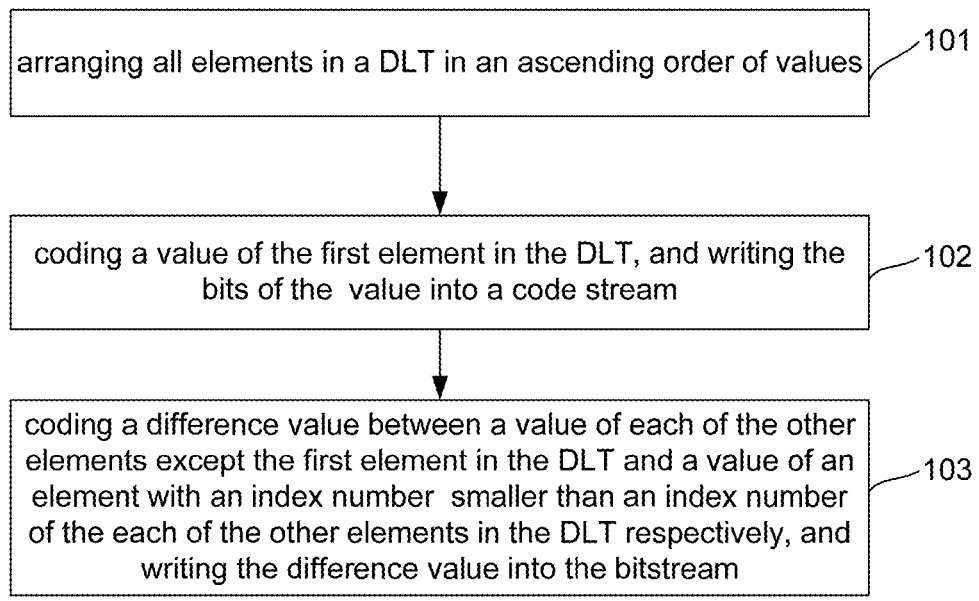
FIG. 1 is a logic flowchart of a coding method according to an embodiment.

The embodiment introduces a method for coding depth information, and as shown in FIG. 1, the method includes the following Steps 101 to 103:

Step 101: All elements in a DLT are arranged in ascending order of values.

During a practical application, arranging all the elements in the DLT in the ascending order of the values may be implemented by directly arranging the elements at their corresponding ascending locations when the elements are arranged in the DLT, or by rearranging elements in an existing DLT in the ascending order on the basis of the existing DLT.

Step 102: A value of the first element in the DLT is coded, and the bits of the value of the first element are written into a bitstream.

Step 103: A difference value between a value of each of other elements except the first element in the DLT and a value of an element with an index number smaller than an index number of the each of other elements in the DLT is coded, and the bits of the difference value are written into the bitstream.

On the basis of the method, a preferred solution of selecting different entropy coding methods to code the difference value according to a set threshold value is disclosed. That is, after the difference value between the value of each of other elements except the first element in the DLT and the value of the element with the index number smaller than the index number of the each of other elements in the DLT is determined, a first entropy coding method (for example, entropy coding method E1) is selected to code the difference value when the difference value is smaller than or equal to the set threshold value, and a second entropy coding method (for example, entropy coding method E2) is selected to code the difference value when the difference value is greater than the set threshold value; wherein, the set threshold value may be a preset fixed value, or a variable which is dynamically regulated in a coding process. The set threshold value may be set for the whole DLT, that is, each DLT element corresponds to a set threshold value. Of course, the set threshold value may also be set for the other elements except the first element in the DLT respectively, that is, a DLT including N elements correspond to N−1 set threshold values.

It is important to further note that the bits of DLT information may further be written into the bitstream in the coding process, wherein the DLT information includes information about the number of the elements.

In addition, before the difference value is coded, auxiliary information may further be coded and written into the bitstream, the auxiliary information being configured to identify which entropy coding method is used for coding the difference value. Therefore, an entropy decoding method for decoding the difference value may be determined according to the auxiliary information during a decoding process.

Embodiment 2

Figure 2:
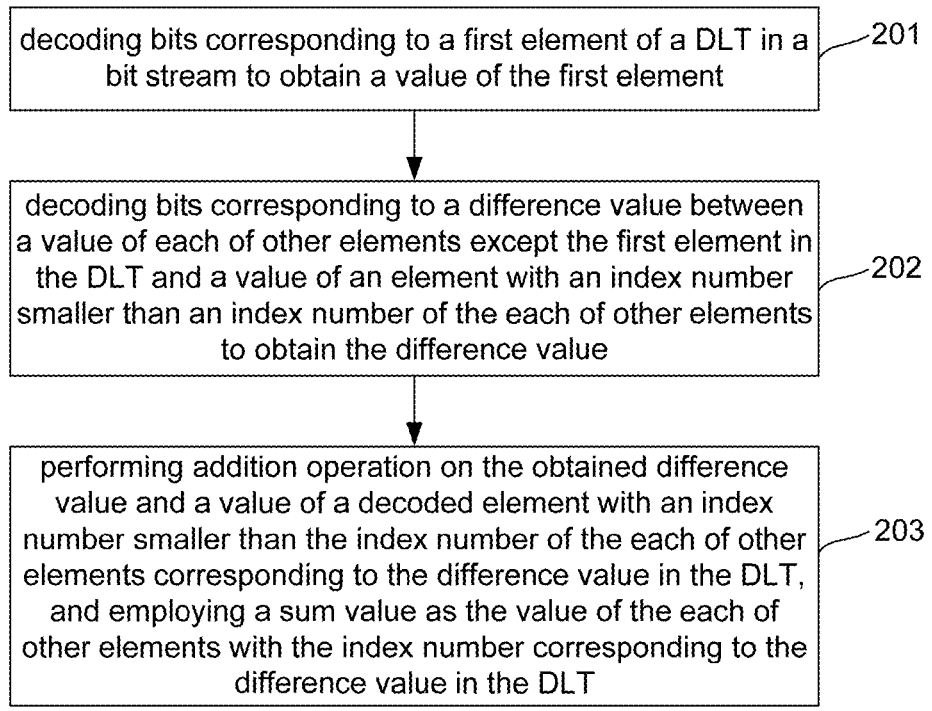
FIG. 2 is a logic flowchart of a decoding method according to an embodiment.

The embodiment introduces a method for decoding depth information, the bitstream coded in embodiment 1 may be decoded by the method, and as shown in FIG. 2, a decoding process includes the following Steps 201 to 203:

Step 201: Bits corresponding to a first element of a DLT in a bitstream are decoded to obtain a value of the first element;

Step 202: Bits corresponding to a difference value between a value of each of other elements except the first element in the DLT and a value of an element with an index number smaller than an index number of the each of other elements are decoded to obtain the difference value; and Step 203: Addition operation is performed on the obtained difference value and the value of the decoded value with the index number smaller than the index number of the each of other elements corresponding to the difference value in the DLT, and employing a sum value as the value of the each of other elements with the index number corresponding to the difference value in the DLT.

It is important to note that DLT information may further be received before the DLT is decoded, the DLT information including information about the number of the elements in the decoded DLT.

In addition, the received bitstream may further include auxiliary information of the difference value in the DLT, and then bits corresponding to the auxiliary information of the difference value are decoded to identify an entropy coding method for the difference value before the bits corresponding to the difference value are decoded, and the difference value is decoded according to an entropy decoding method corresponding to the entropy coding method for the difference value.

Embodiment 3

The embodiment introduces specific processes for coding and decoding depth information according to the coding and decoding methods in embodiment 1 and embodiment 2 in specific application scenarios.

A DLT bitstream organization method of the embodiment is shown in Table 1. The DLT bitstream organization method is applied to coding and transmission of a DLT information bitstream in a bitstream organization structure such as a parameter set, a slice header or a slice segment header.

According to a method for identifying depth information in a bitstream as shown in Table 1, information about the number of elements in a DLT is identified; a value of the first element in the DLT is identified; a difference value between a value of each of other elements except the first element in the DLT and a value of an element with an index number smaller than an index number of the each of other elements in the DLT is identified; and auxiliary information about an entropy decoding method for decoding bits corresponding to the difference value is identified.

The corresponding bitstream contains the following bits: bits of the information about the number of the elements in the DLT; bits of the value of the first element in the DLT; bits of the difference value between the value of each of other elements except the first element in the DLT and the value of the element with the index number smaller than the index number of the each of other elements in the DLT; and bits for identifying the auxiliary information about the entropy decoding method for decoding the bits of the difference value. The bitstream may be configured to code DLT data in the parameter set and/or slice header information and/or slice segment header information. The DLT bitstream organization method in the embodiment is shown in Table 1:

TABLE 1

| | Descriptor |
|---|---|
| ...... | |
| if ( DepthFlag ) { | |
|   dlt_flag | u(1) |
|   if (dlt_flag) { | |
|     num_depth_values_in_dlt | ue(v) |
|     dlt_depth_value[0] | ue(v) |
|     for ( i = 0; i < num_depth_values_in_dlt ; i++ ) { | |
|       dlt_depth_diff_minus1[ i ] | ue(v) |
|     } | |
|   } | |
| } | |
| ...... | |

The semantics (a corresponding decoding operation) of each syntax element in Table 1 is as follows, wherein DepthFlag is a flag bit configured to identify whether currently processed component is depth component or not.

dlt_flag equal to 1 indicates that DLT is used in decoding process; otherwise, dlt_flag equal to 0 indicates that DLT is not used in decoding process. Coding and decoding methods for this element is the coding and decoding methods corresponding to u(1).

num_depth_values_in_dlt is the number of numerical values of depth samples included in the DLT. Coding and decoding methods for this element may be the coding and decoding methods corresponding to ue(v), or may also be coding and decoding methods corresponding to u(v). When the coding and decoding methods corresponding to u(v) are used, the number of bits for representing num_depth_values_in_dlt in the bitstream is equal to bit depth of depth component.

dlt_depth_value[0] is the value of the first element in the DLT. Coding and decoding methods for this element may be the coding and decoding methods corresponding to ue(v), or may also be the coding and decoding methods corresponding to u(v). When the coding and decoding methods corresponding to u(v) are used, the number of bits for representing dlt_depth_value[0] in the bitstream is equal to bit depth of depth component.

dlt_depth_diff_minus1[i] is the value of difference between the ith element and the (i−1)th element in the DLT. dlt_depth_diff_minus1[i] shall be a non-negative integer value. The value of each of the other elements except the first element in the DLT is determined as: dlt_depth_value[i]=dlt_depth_diff_minus1[i]+1+dlt_depth_value[i−1], wherein the value of i is 1, 2, . . . , num_depth_values_in_dlt−1. Coding and decoding methods for this element may be the coding and decoding methods corresponding to ue(v), or may also be the coding and decoding methods corresponding to u(v). When the coding and decoding methods corresponding to u(v) are used, the number of bits for representing dlt_depth_diff_minus1[i] in the bitstream is equal to bit depth of depth component.

Figure 3:
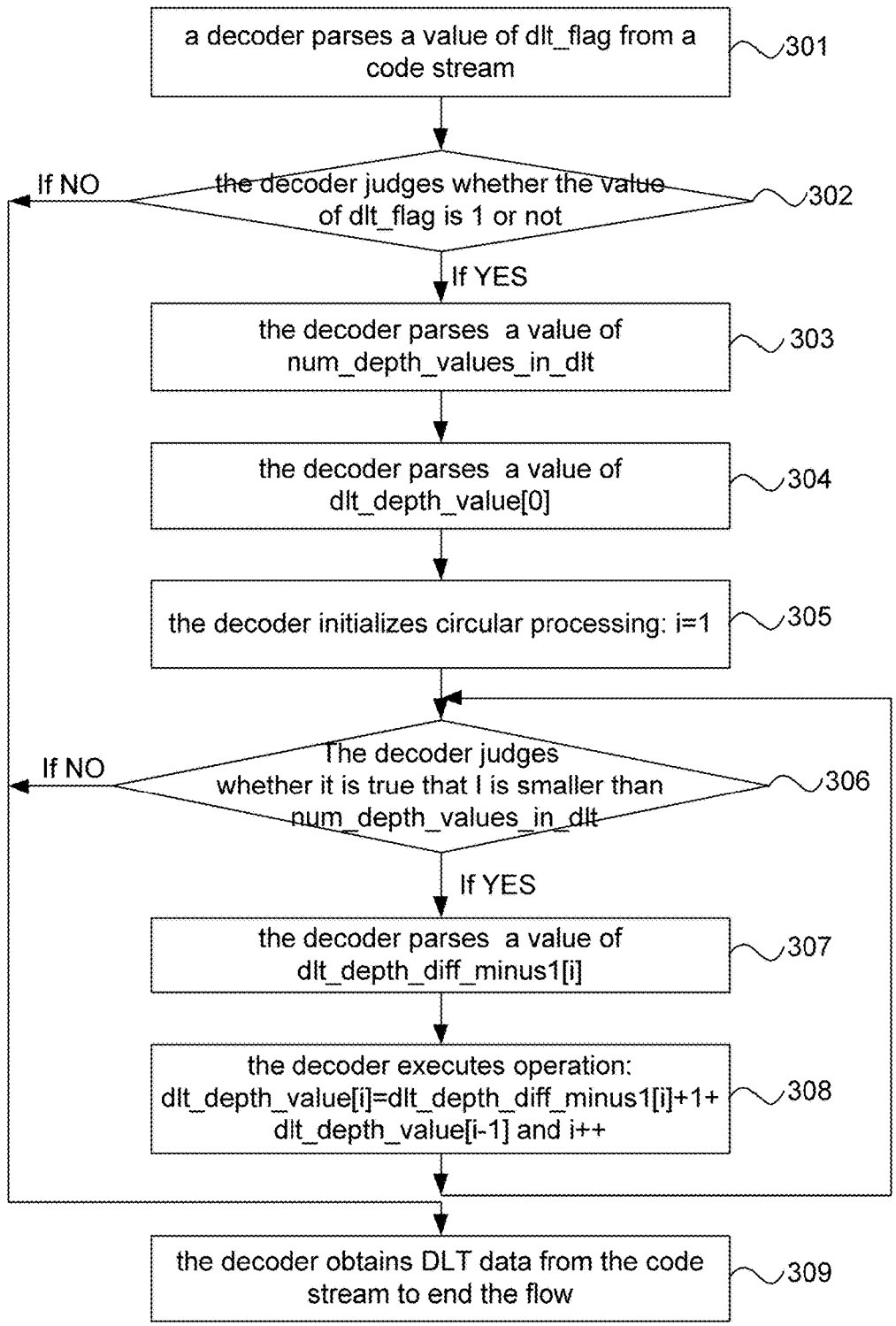
FIG. 3 is a flowchart of decoding according to embodiment 3.

As shown in FIG. 3, a process for decoding a bitstream employing the bitstream organization method shown in Table 1 includes the following Step 301 to 309:

Step 301: The decoder parses the value of dlt_flag from the bitstream.

The decoder parses the bits corresponding to dlt_flag from the bitstream to obtain the value of dlt_flag using the decoding method corresponding to u(1).

Step 302: The decoder judges whether the value of dlt_flag is 1 or not, executes Step 303 if it is 1, otherwise executes Step 309.

Step 303: The decoder parses the value of num_depth_values_in_dlt.

The decoder parses the bits corresponding to num_depth_values_in_dlt from the bitstream to obtain the value of num_depth_values_in_dlt using the decoding method corresponding to ue(v).

Or, the decoder parses the bits corresponding to num_depth_values_in_dlt from the bitstream to obtain the value of num_depth_values_in_dlt using the decoding method corresponding to u(v).

Step 304: The decoder parses the value of dlt_depth_value[0].

The decoder parses the bits corresponding to dlt_depth_value[0] from the bitstream to obtain the value of dlt_depth_value[0] using the decoding method corresponding to ue(v).

Or, the decoder parses the bits corresponding to dlt_depth_value[0] from the bitstream to obtain the value of dlt_depth_value[0] using the decoding method corresponding to u(v).

Step 305: The decoder initializes circular processing: i=1.

Step 306: The decoder judges whether it is true that i is smaller than num_depth_values_in_dlt or not, executes Step 307 if it is true, otherwise executes Step 309.

Step 307: The decoder parses the value of dlt_depth_diff_minus1[i].

The decoder parses the bits corresponding to dlt_depth_diff_minus1[i] from the bitstream to obtain the value of dlt_depth_diff_minus1[i] using the decoding method corresponding to ue(v).

Or, the decoder parses the bits corresponding to dlt_depth_diff_minus1[i] from the bitstream to obtain the value of dlt_depth_diff_minus1[i] using the decoding method corresponding to u(v).

Step 308: The decoder executes the following operation: dlt_depth_value[i]=dlt_depth_diff_minus1[i]+1+dlt_depth_value[i−1] and i++, and returns to Step 306.

Step 309: The decoder obtains DLT data from the bitstream to end the flow, the DLT data being stored in array dlt_depth_value.

Figure 4:
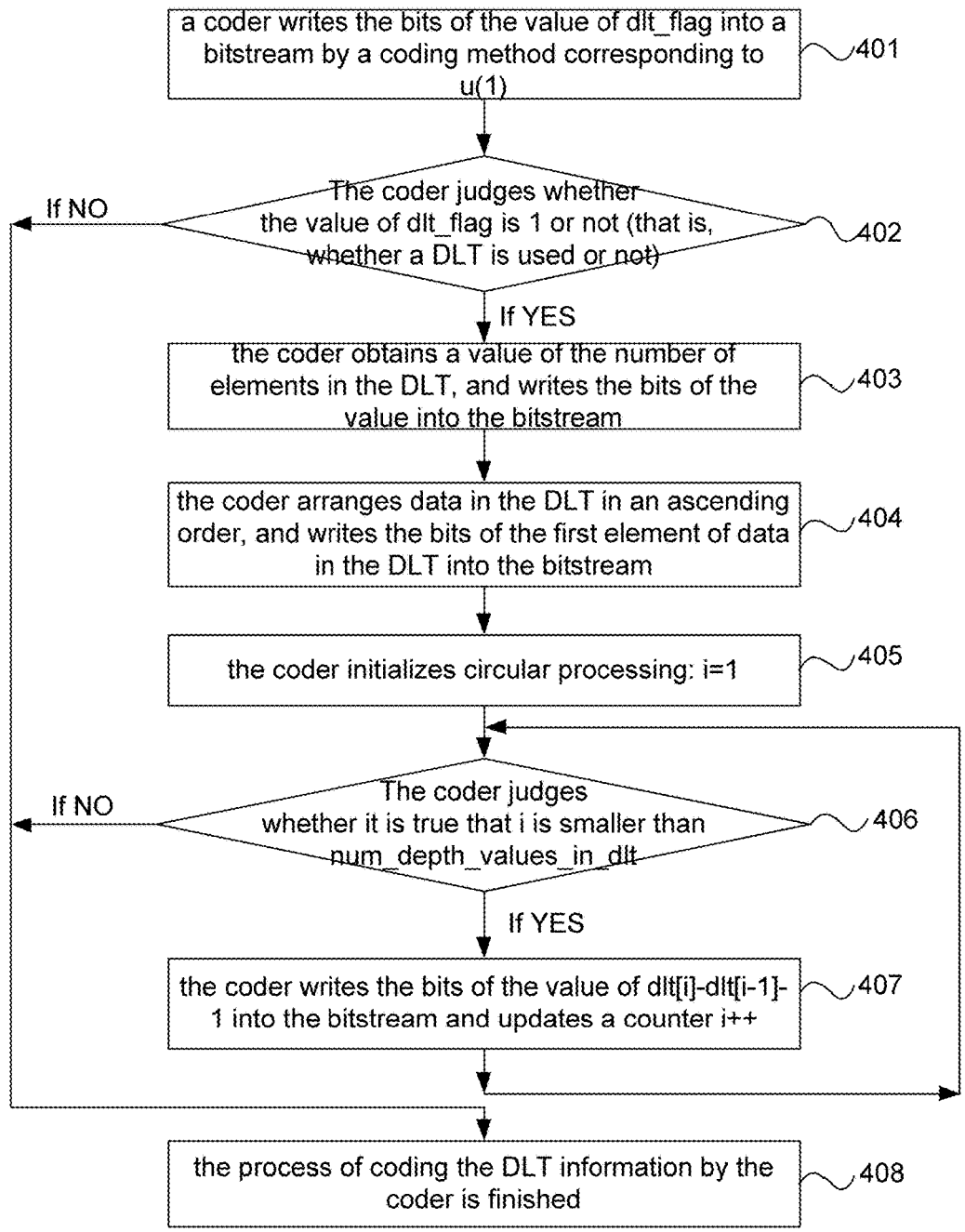
FIG. 4 is a flowchart of coding according to embodiment 3.

As shown in FIG. 4, a coding process employing the bitstream organization method shown in Table 1 includes the following Step 401 to 408:

Step 401: A coder codes and writes the value of dlt_flag into the bitstream using the coding method corresponding to u(1).

The coder judges whether it is necessary to use the DLT or not in a coding process using an existing coder optimization technology. If the DLT is used, the value of dlt_flag is set to be 1; otherwise, the value of dlt_flag is set to be 0.

Step 402: The coder judges whether the value of dlt_flag is 1 or not, executes Step 403 if YES, otherwise executes Step 408.

Step 403: The coder obtains a value of the number of the elements in the DLT, and codes and writes the value into the bitstream.

The coder obtains original data of the DLT using the existing method, stores the original data into an array, determines the number of effective elements included in the array, and employs the number of the effective elements as the value of the number of the elements in the DLT.

Step 404: The coder arranges the data in the DLT in ascending order, and codes and writes the first datum in the DLT into the bitstream.

The coder arranges the data in the DLT in ascending order; or, the coder arranges the data in the array storing the DLT in ascending order of the original data when acquiring the original data of the DLT.

The coder codes and writes a value of the first element in the DLT into the bitstream using the coding method corresponding to ue(v). Or the coder codes and writes the value of the first element in the DLT into the bitstream using the coding method corresponding to u(v).

Step 405: The coder initializes circular processing: i=1.

Step 406: The coder judges whether it is true that i is smaller than num_depth_values_in_dlt, executes Step 407 if it is true, otherwise executes Step 408.

Step 407: The coder executes operation: coding and writing the value of dlt[i]−dlt[i−1]−1 into the bitstream and updating a counter i++; and returns to Step 406.

The coder codes and writes the value of dlt[i]−dlt[i−1]−1 into the bitstream using the coding method corresponding to ue(v). Or, the coder codes and writes the value of dlt[i]−dlt[i−1]−1 into the bitstream using the coding method corresponding to u(v).

Step 408: The process of coding the DLT information using the coder is finished.

Embodiment 4

The embodiment introduces specific processes for coding and decoding depth information according to the coding and decoding methods in embodiment 1 and embodiment 2 IN specific application scenarios.

A DLT bitstream organization method for the embodiment is shown in Table 2. The DLT bitstream organization method is applied to coding and transmission of a DLT information bitstream in a bitstream organization structure such as a parameter set, a slice header or a slice segment header.

According to a method for identifying depth information in the bitstream as shown in Table 2, information about the number of elements in a DLT is identified; a value of the first element in the DLT is identified; a difference value between a value of each of other elements except the first element in the DLT and a value of an element with an index number smaller than an index number of the each of other elements in the DLT is identified; and auxiliary information about an entropy decoding method for decoding bits corresponding to the differences is identified.

The corresponding bitstream contains the following bits: bits of the information about the number of the elements in the DLT; bits of the value of the first element in the DLT; bits of the difference value between the value of each of the other elements except the first element in the DLT and the value of the element with the index number smaller than the index number of the each of other elements in the DLT; and bits for identifying the auxiliary information about the entropy decoding method for decoding the bits of the difference value. The bitstream may be configured to code DLT data in the parameter set and/or slice header information and/or slice segment header information.

The DLT bitstream organization method in embodiment 4 is shown in Table 2:

TABLE 2

| | Descriptor |
|---|---|
| ...... | |
| if ( DepthFlag ) { | |
|   dlt_flag | u(1) |
|   if (dlt_flag) { | |
|     num_depth_values_in_dlt | u(v) |
|     dlt_depth_value[0] | u(v) |
|     for ( i = 0; i < num_depth_values_in_dlt ; i++ ) { | |
|       dlt_depth_diff_minus1_less_than_4_flag[ i ] | u(1) |
|       if (dlt_depth_diff_minus1_less_than_4_flag[ i ]) | |
|         dlt_depth_diff_minus1[ i ] | u(2) |
|       else | |
|         dlt_depth_diff_minus1_minus4[ i ] | ue(v) |
|       } | |
|     } | |
|   } | |
| ...... | |

The semantics (corresponding decoder operation) of each syntax element in Table 2 is as follows. DepthFlag is a flag bit configured to identify whether currently processed component is depth component or not.

dlt_flag equal to 1 indicates that DLT is used in decoding process; otherwise, dlt_flag equal to 0 indicates that DLT is not used in decoding process. Coding and decoding methods for this element are coding and decoding methods corresponding to u(1).

num_depth_values_in_dlt is the value of the number of numerical values of depth samples included in the DLT. Its coding and decoding methods may be coding and decoding methods corresponding to ue(v), or may also be coding and decoding methods corresponding to u(v). When the coding and decoding methods corresponding to u(v) are used, the number of bits for representing num_depth_values_in_dlt in the bitstream is equal to bit depth of depth component.

dlt_depth_value[0] is the value of the first element in the DLT. Coding and decoding methods for this element may be the coding and decoding methods corresponding to ue(v), or may also be the coding and decoding methods corresponding to u(v). When the coding and decoding methods corresponding to u(v) are used, the number of bits for representing dlt_depth_value[0] in the bitstream is equal to bit depth of depth component.

dlt_depth_diff_minus1_less_than_4_flag[i] equal to 1 indicates that a value obtained by subtracting 1 from the difference value between the ith element and the (i−1)th element in the DLT is smaller than 4; otherwise, dlt_depth_diff_minus1_less_than_4_flag[i] equal to 1 indicates that the value obtained by subtracting 1 from the difference value between the ith element and the (i−1)th element in the DLT is greater than 4. Coding and decoding methods for this element adopt the coding and decoding methods corresponding to u(1).

dlt_depth_diff_minus1[i] is the value of the difference between the ith element and the (i−1)th element in the DLT. dlt_depth_diff_minus1[i] shall be a non-negative integer value. The value of each of the other elements except the first element in the DLT is determined as: dlt_depth_value[i]=dlt_depth_diff_minus1[i]+1+dlt_depth_value[i−1], wherein a value of i is 1, 2, . . . , num_depth_values_in_dlt−1. Coding and decoding methods for this element may be the coding and decoding methods corresponding to u(2).

dlt_depth_diff_minus1_minus4[i] is the value of the difference between the ith element and the (i−1)th element in the DLT. dlt_depth_diff_minus1_minus4[i] shall be a non-negative integer value. The value of each of the other elements except the first element in the DLT is determined as: dlt_depth_value[i]=dlt_depth_diff_minus1_minus4[i]+1+4+dlt_depth_value[i−1], wherein the value of i is 1, 2, . . . , num_depth_values_in_dlt−1. Coding and decoding methods for this element may be the coding and decoding methods corresponding to ue(v), or may also be the coding and decoding methods corresponding to u(v). When the coding and decoding methods for u(v) are used, the number of bits for representing dlt_depth_diff_minus1_minus4[i] in the bitstream is equal to bit depth of depth component.

Figure 5:
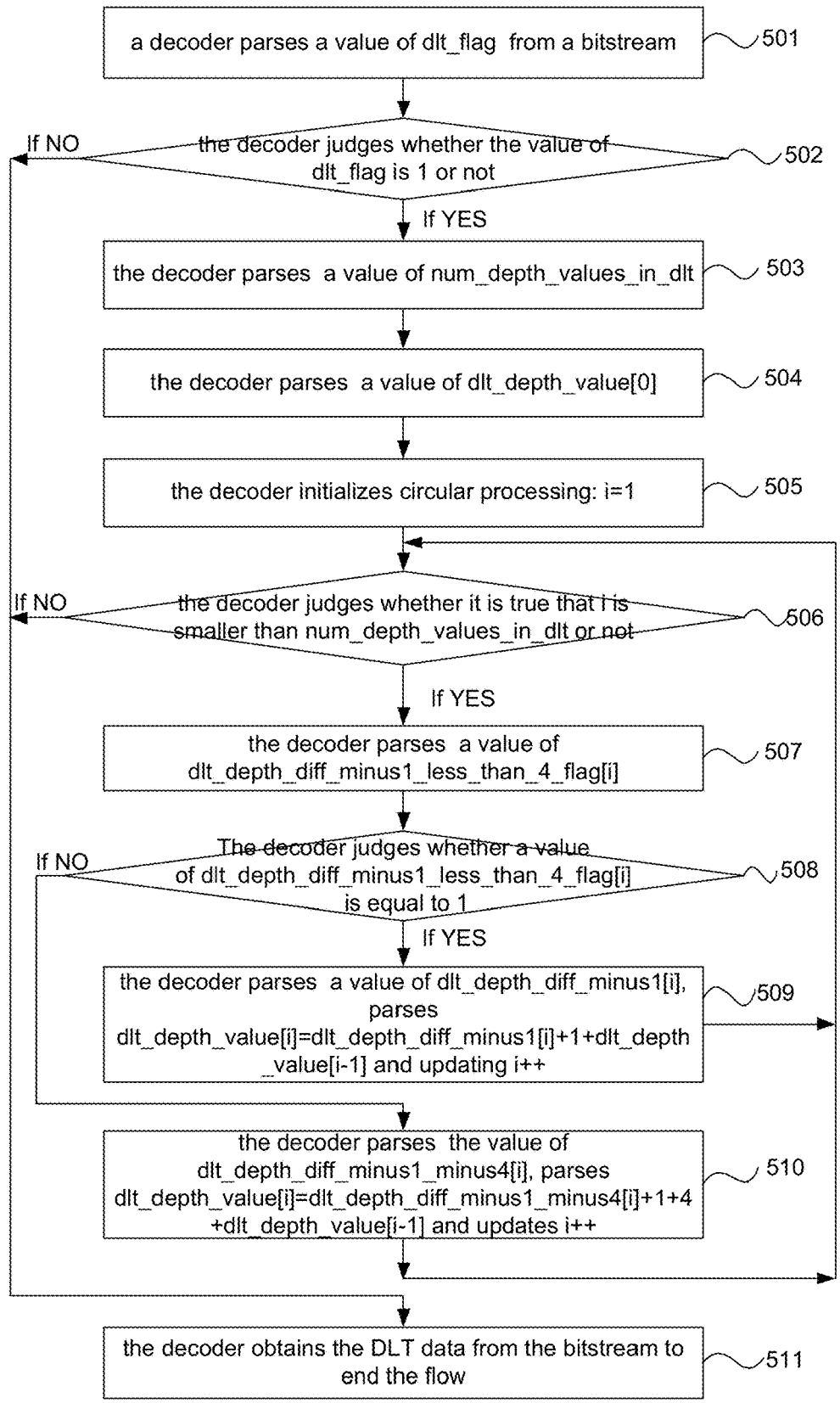
FIG. 5 is a flowchart of decoding according to embodiment 4

As shown in FIG. 5, a decoding process employing the bitstream organization method shown in Table 2 includes the following Step 501 to 511:

Step 501: It is completely the same as Step 301.

Step 502: The decoder judges whether the value of dlt_flag is 1 or not, executes Step 503 if YES, otherwise executes Step 511.

Step 503: It is completely the same as Step 303.

Step 504: It is completely the same as Step 304.

Step 505: It is completely the same as Step 305.

Step 506: The decoder judges whether it is true that i is smaller than num_depth_values_in_dlt, executes Step 507 if it is true, otherwise executes Step 511.

Step 507: The decoder parses the value of dlt_depth_diff_minus1_less_than_4_flag[i].

The decoder parses the bits corresponding to dlt_depth_diff_minus1_less_than_4_flag[i] from the bitstream to obtain the value of dlt_depth_diff_minus1_less_than_4_flag[i] using the decoding method corresponding to u(1).

Step 508: The decoder judges whether the value of dlt_depth_diff_minus1_less_than_4_flag[i] is equal to 1 or not, executes 509 if it is 1, otherwise executes Step 510.

Step 509: The decoder parses the value of dlt_depth_diff_minus1[i], parses dlt_depth_value[i]=dlt_depth_diff_minus1[i]+1+dlt_depth_value[i−1] and updates i++, and returns to Step 506.

The decoder parses the bits corresponding to dlt_depth_diff_minus1[i] from the bitstream to obtain the value of dlt_depth_diff_minus1[i] using a decoding method corresponding to u(2).

Step 510: The decoder parses the value of dlt_depth_diff_minus1_minus4[i], parses dlt_depth_value[i]=dlt_depth_diff_minus1_minus4[i]+1+4+dlt_ depth_value[i−1] and updates i++, and returns to Step 506.

The decoder parses the bits corresponding to dlt_depth_diff_minus1_minus4[i] from the bitstream to obtain the value of dlt_depth_diff_minus1_minus4[i] using the decoding method corresponding to ue(v).

Alternatively, the decoder parses the bits corresponding to dlt_depth_diff_minus1_minus4[i] from the bitstream to obtain the value of dlt_depth_diff_minus1_minus4[i] using the decoding method corresponding to u(v).

Step 511: The decoder obtains the DLT data from the bitstream to end the flow, the DLT data being stored in array dlt_depth_value.

Figure 6:
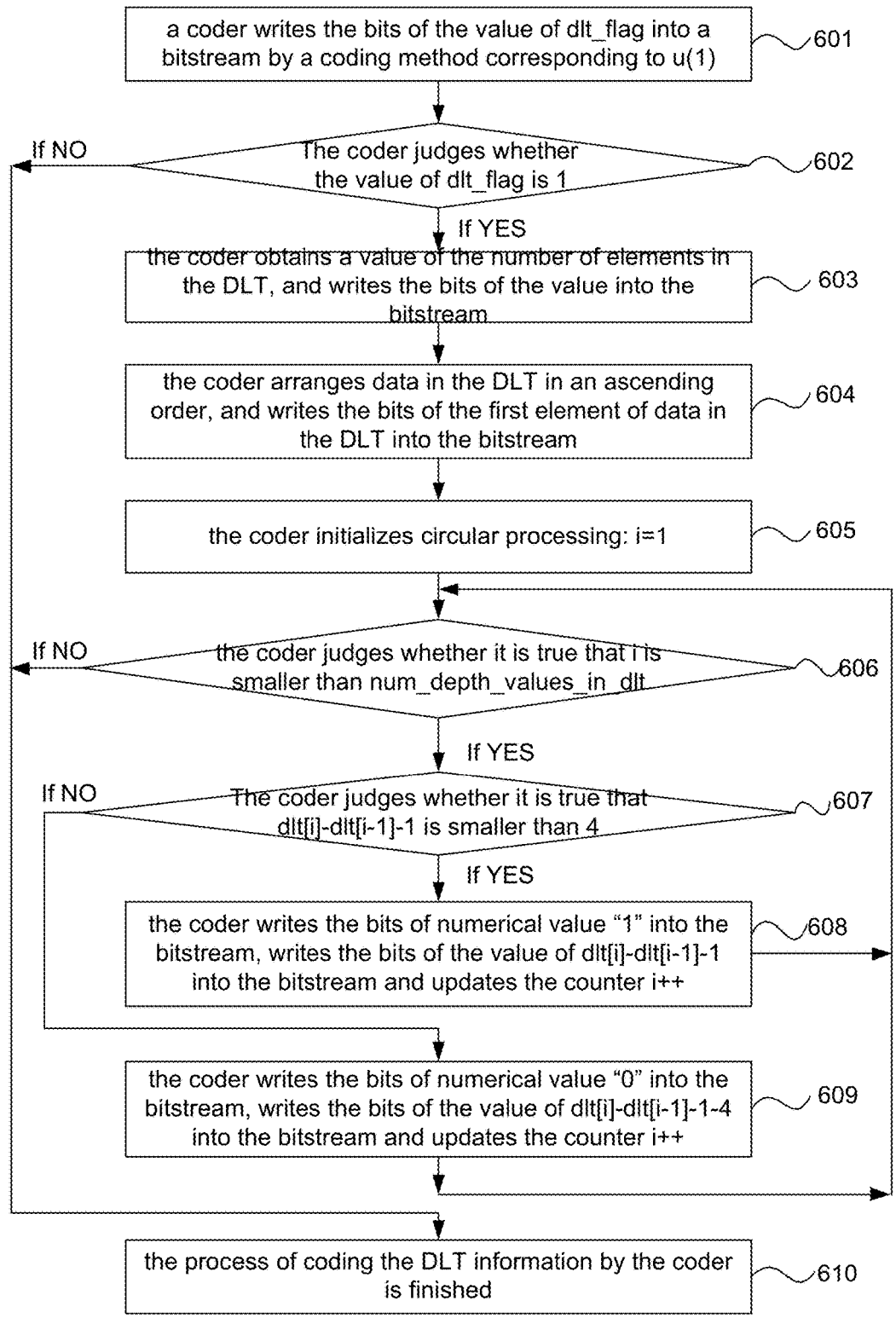
FIG. 6 is a flowchart of coding according to embodiment 4.

As shown in FIG. 6, a coding process employing the bitstream organization method shown in Table 2 includes the following Step 601 to 610:

Step 601: It is completely the same as Step 401.

Step 602: The coder judges whether the value of dlt_flag is 1 or not, executes Step 603 if YES, otherwise executes Step 610.

Step 603: It is completely the same as Step 403.

Step 604: It is completely the same as Step 404.

Step 605: It is completely the same as Step 405.

Step 606: The coder judges whether it is true that i is smaller than num_depth_values_in_dlt, executes Step 607 if it is true, otherwise executes Step 610.

Step 607: The coder judges whether it is true that dlt[i]−dlt[i−1]−1 is smaller than 4, executes Step 608 if YES, otherwise executes Step 609.

Step 608: The coder codes and writes a numerical value "1" into the bitstream, codes and writes the value of dlt[i]−dlt[i−1]−1 into the bitstream and updates the counter i++, and executes Step 606.

Step 609: The coder codes and writes a numerical value "0" into the bitstream, codes and writes the value of dlt[i]−dlt[i−1]−1−4 into the bitstream and updates the counter i++, and executes Step 606.

Step 610: The process of coding the DLT information using the coder is finished.

Embodiment 5

The embodiment introduces specific processes for coding and decoding depth information according to the coding and decoding methods in embodiment 1 and embodiment 2 for specific application scenarios.

A DLT bitstream organization method for the embodiment is shown in Table 3. The DLT bitstream organization method is applied to coding and transmission of a DLT information bitstream in a bitstream organization structure such as a parameter set, a slice header or a slice segment header.

According to a method for identifying depth information in the bitstream as shown in Table 3, information about the number of elements in a DLT is identified; a value of the first element in the DLT is identified; difference value between a value of each of the other elements except the first element in the DLT and value of the element with the index number smaller than the index number of the element in the DLT is identified; and auxiliary information for an entropy decoding method for decoding bits corresponding to the difference value is identified.

The corresponding bitstream contains the following bits: bits of the information about the number of the elements in the DLT; bits of the value of the first element in the DLT; bits of the difference value between the value of each of other elements except the first element in the DLT and the value of the element with the index number smaller than the index number of the each of other elements in the DLT; and bits for identifying the auxiliary information about the entropy decoding method for decoding the bits of the difference value. The bitstream may be configured to code DLT data in the parameter set and/or slice header information and/or slice segment header information. The DLT bitstream organization method in embodiment 5 is shown in Table 3:

TABLE 3

| ...... | Descriptor |
|---|---|
| if ( DepthFlag ) { | |
|   dlt_flag | u(1) |
|   if (dlt_flag) { | |
|     num_depth_values_in_dlt | u(v) |
|     dlt_depth_value[0] | u(v) |
|     dlt_depth_diff_threshold | u(3) |
|     for ( i = 0; i < num_depth_values_in_dlt ; i++ ) { | |
|       if ( dlt_depth_diff_threshold ) { | |
|         dlt_depth_diff_minus1_less_than_threshold_flag[ i ] | u(1) |
|         if (dlt_depth_diff_minus1_less_than_threshold_flag[ i ]) | |
|           dlt_depth_diff_minus1[ i ] | u(v) |
|         else | |
|           dlt_depth_diff_minus1_minus4[ i ] | ue(v) |
|       } | |
|       else | |
|         dlt_depth_diff_minus1[ i ] | ue(v) |
|     } | |
|   } | |
| } | |
| ...... | |

The semantics (a corresponding decoder operation) of each syntax element in Table 3 is as follows. DepthFlag is a flag bit configured to identify whether currently processed component is depth component or not.

dlt_flag equal to 1 indicates that DLT is used in decoding process; otherwise, dlt_flag equal to 0 indicates that DLT is not used in decoding process. Coding and decoding methods for this element are coding and decoding methods corresponding to u(1).

num_depth_values_in_dlt is the value of the number of numerical values of depth samples included in the DLT. Coding and decoding methods for this element may be coding and decoding methods corresponding to u(v), or may also be coding and decoding methods corresponding to ue(v). When the coding and decoding methods corresponding to u(v) are used, the number of bits for representing num_depth_values_in_dlt in the bitstream is equal to bit depth of depth component.

dlt_depth_value[0] is the value of the first element in the DLT. Coding and decoding methods for this element may be the coding and decoding methods corresponding to u(v), or may be the coding and decoding methods corresponding to ue(v). When the coding and decoding methods corresponding to u(v) are used, the number of bits for representing dlt_depth_value[0] in the bitstream is equal to bit depth of depth component.

dlt_depth_diff_threshold is a threshold value for switching DLT entropy coding methods. Coding and decoding methods for this element are coding and decoding methods corresponding to u(3). Decoding operation corresponding to a value of the element is as follows, wherein, operator "a<<b" in Table 4 represents the operation of rightward shifting of a binary value of a by b bits. The corresponding operation on the value of dlt_depth_diff_threshold in embodiment 5 is shown in Table 4:

TABLE 4

| Binary value of element | Corresponding operation |
|---|---|
| 000 | The DLT element is parsed using the decoding method corresponding to ue(v). |
| 001 | When the threshold value is equal to 2 (1<<1), the decoder selects the decoding methods corresponding to u(1) and ue(v) to parse the DLT element according to a value of a flag bit dlt_depth_diff_minus1_less_than_threshold_flag[i]. |
| 010 | When the threshold value is equal to 4 (1<<2), the decoder selects the decoding methods corresponding to u(1) and ue(v) to parse the DLT element according to the value of the flag bit dlt_depth_diff_minus1_less_than_threshold_flag[i]. |
| 011 | When the threshold value is equal to 8 (1<<3), the decoder selects the decoding methods corresponding to u(1) and ue(v) to parse the DLT element according to the value of the flag bit dlt_depth_diff_minus1_less_than_threshold_flag[i]. |
| 100 | When the threshold value is equal to 16 (1<<4), the decoder selects the decoding methods corresponding to u(1) and ue(v) to parse the DLT element according to the value of the flag bit dlt_depth_diff_minus1_less_than_threshold_flag[i]. |
| 101 | When the threshold value is equal to 32 (1<<5), the decoder selects the decoding methods corresponding to u(1) and ue(v) to parse the DLT element according to the value of the flag bit dlt_depth_diff_minus1_less_than_threshold_flag[i]. |
| 110 | When the threshold value is equal to 64 (1<<6), the decoder selects the decoding methods corresponding to u(1) and ue(v) to parse the DLT element according to the value of the flag bit dlt_depth_diff_minus1_less_than_threshold_flag[i]. |

TABLE 4-continued

| Binary value of element | Corresponding operation |
|---|---|
| 111 | When the threshold value is equal to 128 (1<<7), the decoder selects the decoding methods corresponding to u(1) and ue(v) to parse the DLT element according to the value of the flag bit dlt_depth_diff_minus1_less_than_threshold_flag[i]. | dlt_depth_diff_minus1_less_than_threshold_flag[i] equal to 1 indicates that a value obtained by subtracting 1 from a difference value between the ith element and the (i−1)th element in the DLT is smaller than the threshold value; otherwise, dlt_depth_diff_minus1_less_than_threshold_flag[i] equal to 0 indicates that the value obtained by subtracting 1 from the difference value between the ith element and the (i−1)th element in the DLT is greater than the threshold value. Wherein, the threshold value is determined according to the value of dlt_depth_diff_threshold. Coding and decoding methods for this element are the coding and decoding methods corresponding to u(1).

dlt_depth_diff_minus1[i] is the value of the difference between the ith element and the (i−1)th element in the DLT. dlt_depth_diff_minus1[i] shall be a non-negative integer value. The value of each of the other elements except the first element in the DLT is determined as: dlt_depth_value[i]=dlt_depth_diff_minus1[i]+1+dlt_depth_value[i−1], wherein a value of i is 1, 2, . . . , num_depth_values_in_dlt−1. Coding and decoding methods for the element may be the coding and decoding methods corresponding to u(v) and ue(v). When the coding and decoding methods for the element are the coding and decoding methods corresponding to u(v), the number of bits for representing dlt_depth_diff_minus1[i] in the bitstream is equal to the value of dlt_depth_diff_threshold.

dlt_depth_diff_minus1_minus4[i] is the value of the difference between the ith element and the (i−1)th element in the DLT. dlt_depth_diff_minus1_minus4[i] shall be a non-negative integer value. The value of each of the other elements except the first element in the DLT is determined as: dlt_depth_value[i]=dlt_depth_diff_minus1_minus4[i]+1+4+dlt_depth_value[i−1], wherein the value of i is 1, 2, . . . , num_depth_values_in_dlt−1. Coding and decoding methods for this element may be the coding and decoding methods corresponding to ue(v), or may also be the coding and decoding methods corresponding to u(v).

Figure 7:
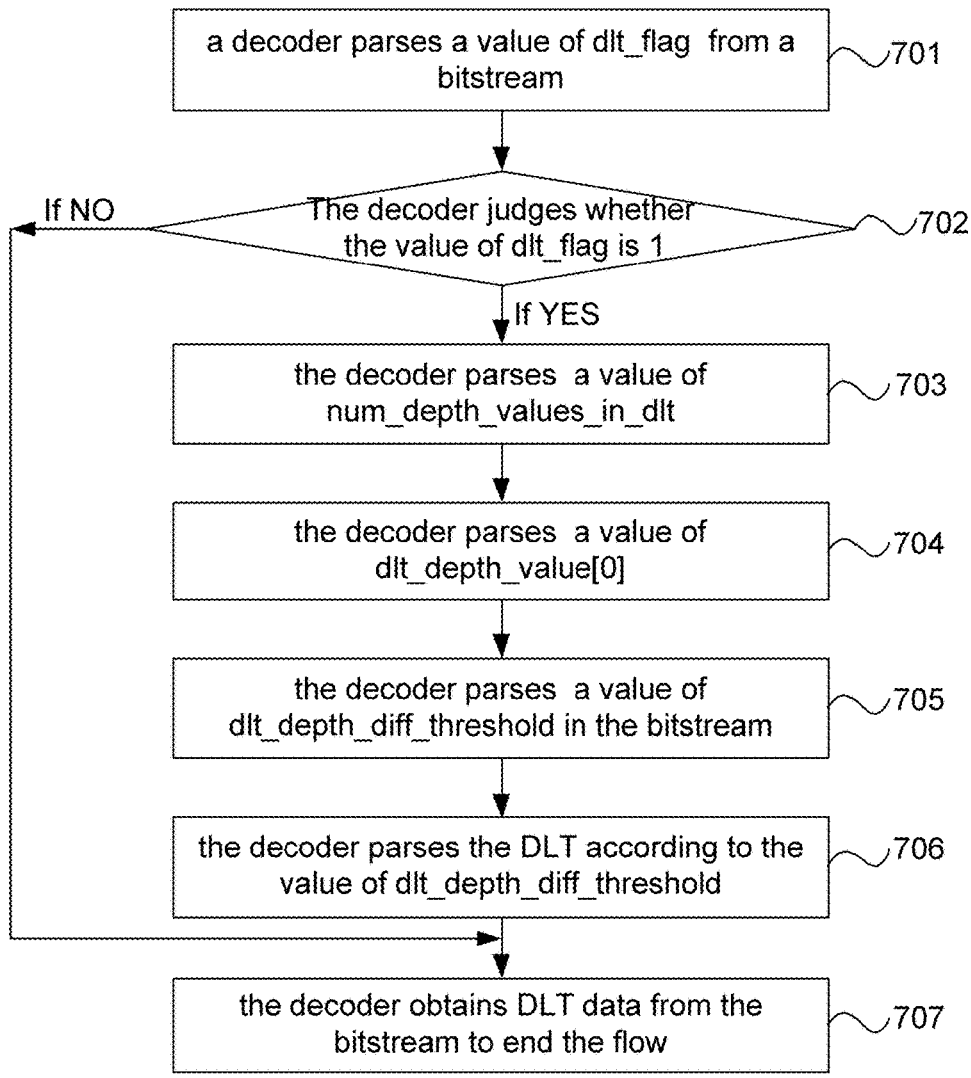
FIG. 7 is a flowchart of decoding according to embodiment 5.

As shown in FIG. 7, a decoding process employing the bitstream organization method shown in Table 3 includes the following Step 701 to 707:

Step 701: It is completely the same as Step 501.

Step 702: The decoder judges whether the value of dlt_flag is 1 or not, executes Step 703 if it is 1, otherwise executes Step 707.

Step 703: It is completely the same as Step 503.

Step 704: It is completely the same as Step 504.

Step 705: The decoder parses the value of dlt_depth_diff_threshold from the bitstream.

The decoder parses the bits corresponding to dlt_depth_diff_threshold from the bitstream to obtain the value of dlt_depth_diff_threshold using the decoding method corresponding to u(3).

Step 706: The decoder parses the DLT according to the value of dlt_depth_diff_threshold.

If the value of dlt_depth_diff_threshold is equal to 0, the decoder parses bits corresponding to dlt_depth_diff_minus1[i] from the bitstream to obtain the value of dlt_depth_diff_minus1[i] using the decoding method corresponding to ue(v), and executes operation dlt_depth_value[i]=dlt_depth_diff_minus1[i]+1+dlt_depth_value[i−1].

Otherwise, if the value of dlt_depth_diff_threshold is equal to 1, the decoder parses bits corresponding to dlt_depth_diff_minus1_less_than_threshold_flag[i] from the bitstream to obtain the value of the flag bit dlt_depth_diff_minus1_less_than_threshold_flag[i] using the decoding method corresponding to u(1). When the value of dlt_depth_diff_minus1_less_than_threshold_flag[i] is equal to 1, the decoder parses the bits (the number of bits for representing this eyntax element is dlt_depth_diff_threshold) corresponding to dlt_depth_diff_minus1[i] from the bitstream to obtain the value of dlt_depth_diff_minus1[i] using the decoding method corresponding to u(v), and executes operation dlt_depth_value[i]=dlt_depth_diff_minus1[i]+1+dlt_depth_value[i−1]. Otherwise, when the value of dlt_depth_diff_minus1_less_than_threshold_flag[i] is equal to 0, the decoder parses bits corresponding to dlt_depth_diff_minus1_minus4[i] from the bitstream to obtain the value of dlt_depth_diff_minus1_minus4[i] by virtue of using the decoding method corresponding to ue(v), and executes operation dlt_depth_value[i]= dlt_depth_diff_minus1_minus4[i]+1+4+dlt_depth_value[i−1].

Step 707: The decoder obtains DLT data from the bitstream to end the flow, the DLT data being stored in array dlt_depth_value.

Figure 8:
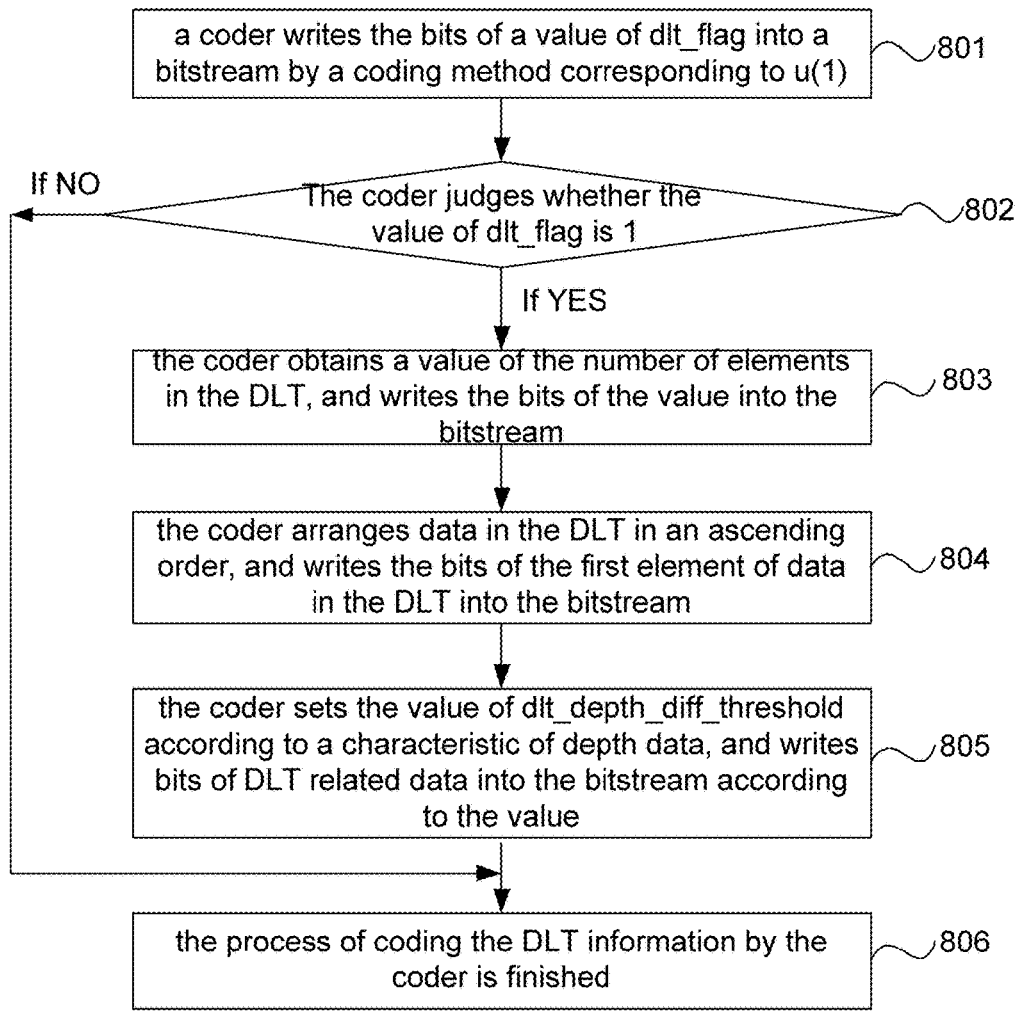
FIG. 8 is a flowchart of coding according to embodiment 5.

As shown in FIG. 8, a coding process employing the bitstream organization method shown in Table 3 includes the following Step 801 to 806:

Step 801: It is completely the same as Step 601.

Step 802: A coder judges whether the value of dlt_flag is 1 or not, executes Step 803 if it is 1, otherwise executes Step 806.

Step 803: It is completely the same as Step 603.

Step 804: It is completely the same as Step 604.

Step 805: The coder sets the value of dlt_depth_diff_threshold according to a characteristic of depth data, and codes and writes DLT related data into the bitstream according to the value.

The coder may evaluate the tradeoff between coding efficiency and occupied resources (such as calculation complexity and a requirement on a storage space) under different permitted values of dlt_depth_diff_threshold respectively and select the value of dlt_depth_diff_threshold with minimum cost under a set evaluation criterion (such as common rate-distortion criterion).

The coder codes and writes the selected value of dlt_depth_diff_threshold into the bitstream using the coding method corresponding to u(3).

If the value of dlt_depth_diff_threshold is equal to 0, the coder codes and writes the value of dlt[i]−dlt[i−1]−1 into the bitstream using the coding method corresponding to ue(v).

Otherwise, if the value of dlt_depth_diff_threshold is not equal to 0, an execution process of the coder is as follows:

the coder sets the threshold value according to Table 4 and the value of dlt_depth_diff_threshold.

When the coder determines that the value of dlt[i]−dlt[i−1]−1 is smaller than the threshold value, the coder codes and writes numerical value "1" into the bitstream using the coding method corresponding to u(1), and then codes and writes the numerical value of dlt[i]−dlt[i−1]−1 into the bitstream using the coding method corresponding to u(v), the number of used bits being equal to dlt_depth_diff_threshold; otherwise, when the coder determines that the value of dlt[i]−dlt[i−1]−1 is greater than the threshold value, the coder codes and writes numerical value "0" into the bitstream using the coding method corresponding to u(1), and then codes and writes the numerical value of dlt[i]−dlt[i−1]−1−4 into the bitstream using the coding method corresponding to ue(v).

After the coder finishes processing processes for all the elements in the DLT, the step is ended, and Step 806 is executed.

Step 806: The process of coding the DLT information using the coder is finished.

Embodiment 6

The embodiment introduces specific processes for coding and decoding depth information according to the coding and decoding methods in embodiment 1 and embodiment 2 for specific application scenarios.

A DLT bitstream organization method for the embodiment is shown in Table 4. The DLT bitstream organization method is applied to coding and transmission of a DLT information bitstream in a bitstream organization structure such as a parameter set, a slice header or a slice segment header.

According to a method for identifying depth information in the bitstream as shown in Table 5, information about the number of elements in a DLT is identified; a value of the first element in the DLT is identified; a difference value between a value of each of other elements except the first element in the DLT and a value of an element with an index number smaller than an index number of the each of other elements in the DLT is identified; and auxiliary information about an entropy decoding method for decoding bits corresponding to the differences is identified.

The corresponding bitstream contains the following bits: bits of the information about the number of the elements in the DLT; bits of the value of the first element in the DLT; bits of the difference value between the value of each of the other elements except the first element in the DLT and the value of the element with the index number smaller than the index number of the each of other elements in the DLT; and bits for identifying the auxiliary information about the entropy decoding method for decoding the bits of the difference value. The bitstream may be configured to code DLT data in the parameter set and/or slice header information and/or slice segment header information. The DLT bitstream organization method in embodiment 6 is shown in Table 5:

TABLE 5

| ...... | Descriptor |
|---|---|
| if ( DepthFlag ) { | |
|   dlt_flag | u(1) |
|   if (dlt_flag) { | |
|     num_depth_values_in_dlt | u(v) |
|     dlt_depth_value[0] | u(v) |
|     dlt_depth_element_threshold_flag | u(1) |
|     if ( ! dlt_depth_element_threshold_flag ) | |
|       dlt_depth_diff_threshold | u(3) |

TABLE 5-continued

|  | Descriptor |
|---|---|
| ```
    for ( i = 0; i < num_depth_values_in_dlt ; i++ ) {
       if ( dlt_depth_element_threshold_flag )
          dlt_depth_diff_threshold_array[ i ]
          if    (     (dlt_depth_diff_threshold    +
dlt_depth_diff_threshold_array[ i ]) ) {
             dlt_depth_diff_minus1_less_than_threshold_flag[ i ]
             if (dlt_depth_diff_minus1_less_than_threshold_flag[ i ])
                dlt_depth_diff_minus1[ i ]
             else
                dlt_depth_diff_minus1_minus4[ i ]
          }
          else
             dlt_depth_diff_minus1[ i ]
       }
    }
}
``` | u(3)<br><br><br><br>u(1)<br><br>u(v)<br><br>ue(v)<br><br><br>ue(v) |

The semantics (a corresponding decoder operation) of each syntax element in Table 5 is as follows. DepthFlag is a flag bit configured to identify whether a currently processed component is a depth component or not.

dlt_flag equal to 1 indicates that DLT is used in decoding process; otherwise, dlt_flag equal to 0 indicates that DLT is not used in decoding process. Coding and decoding methods for this element are coding and decoding methods corresponding to u(1).

num_depth_values_in_dlt is the value of the number of numerical values of depth samples included in the DLT. Coding and decoding methods for this element may be coding and decoding methods corresponding to u(v), or may also be coding and decoding methods corresponding to ue(v). When the coding and decoding methods corresponding to u(v) are used, the number of bits for representing num_depth_values_in_dlt in the bitstream is equal to bit depth of depth component.

dlt_depth_value[0] is the value of the first element in the DLT. Coding and decoding methods for this element may be the coding and decoding methods corresponding to u(v), or may also be the coding and decoding methods corresponding to ue(v). When the coding and decoding methods corresponding to u(v) are used, the number of bits for representing dlt_depth_value[0] in the bitstream is equal to bit depth of depth component.

dlt_depth_element_threshold_flag equal to 1 indicates that the elements in the DLT adopts their own threshold value to switch entropy coding methods; otherwise, dlt_depth_element_threshold_flag equal to 0 indicates that each element in the DLT adopts the same threshold value to switch entropy coding method.

dlt_depth_diff_threshold is a threshold value for switching DLT entropy coding methods. Coding and decoding methods for this element are coding and decoding methods corresponding to u(3). Decoding operation to a value of the element is as follows, wherein, operator "a<<b" Table 6 represents the operation of rightward shifting of a binary value of a by b bits. The corresponding operation on the value of dlt_depth_diff_threshold in embodiment 6 is shown in Table 6:

TABLE 6

| Binary value of element | Corresponding operation |
|---|---|
| 000 | The DLT element is parsed using the decoding method corresponding to ue(v). |

TABLE 6-continued

| Binary value of element | Corresponding operation |
|---|---|
| 001 | When the threshold value is equal to 2 (1 << 1), the decoder selects the decoding methods corresponding to u(1) and ue(v) to parse the DLT element according to a value of a flag bit dlt_depth_diff_minus1_less_than_threshold_flag[i]. |
| 010 | When the threshold value is equal to 4 (1 << 2), the decoder selects the decoding methods corresponding to u(1) and ue(v) to parse the DLT element according to the value of the flag bit dlt_depth_diff_minus1_less_than_threshold_flag[i]. |
| 011 | When the threshold value is equal to 8 (1 << 3), the decoder selects the decoding methods corresponding to u(1) and ue(v) to parse the DLT element according to the value of the flag bit dlt_depth_diff_minus1_less_than_threshold_flag[i]. |
| 100 | When the threshold value is equal to 16 (1 << 4), the decoder selects the decoding methods corresponding to u(1) and ue(v) to parse the DLT element according to the value of the flag bit dlt_depth_diff_minus1_less_than_threshold_flag[i]. |
| 101 | When the threshold value is equal to 32 (1 << 5), the decoder selects the decoding methods corresponding to u(1) and ue(v) to parse the DLT element according to the value of the flag bit dlt_depth_diff_minus1_less_than_threshold_flag[i]. |
| 110 | When the threshold value is equal to 64 (1 << 6), the decoder selects the decoding methods corresponding to u(1) and ue(v) to parse the DLT element according to the value of the flag bit dlt_depth_diff_minus1_less_than_threshold_flag[i]. |
| 111 | When the threshold value is equal to 128 (1 << 7), the decoder selects the decoding methods corresponding to u(1) and ue(v) to parse the DLT element according to the value of the flag bit dlt_depth_diff_minus1_less_than_threshold_flag[i]. | dlt_depth_diff_threshold_array[i] is the threshold value for switching DLT entropy coding methods for the ith element. Coding and decoding methods for this element are the coding and decoding methods corresponding to u(3). Decoding operation on a value of the element is the same as that on dlt_depth_diff_threshold, as shown in Table 6.

dlt_depth_diff_minus1_less_than_threshold_flag[i] equal to 1 indicates that a value obtained by subtracting 1 from a difference value between the ith element and the (i−1)th element in the DLT is smaller than the threshold value; otherwise, dlt_depth_diff_minus1_less_than_threshold_flag[i] equal to 0 indicates that the value obtained by subtracting 1 from the difference value between the ith element and the (i−1)th element in the DLT is greater than the threshold value. Wherein, the threshold value is determined according to the value of dlt_depth_diff_threshold. Coding and decoding methods for this element are the coding and decoding methods corresponding to u(1).

dlt_depth_diff_minus1[i] is the value of the difference between the ith element and the (i−1)th element in the DLT. dlt_depth_diff_minus1[i] shall be a non-negative integer value. The value of each of the other elements except the first element in the DLT is determined as: dlt_depth_value[i]=dlt_depth_diff_minus1[i]+1+dlt_depth_value[i−1], wherein a value of i is 1, 2, ..., num_depth_values_in_dlt−1. Coding and decoding methods for this element may be the coding and decoding methods corresponding to ue(v) and u(v). When the coding and decoding methods for the element are the coding and decoding methods corresponding to u(v) and the value of dlt_depth_element_threshold_flag is equal to 1, the number of bits for representing dlt_depth_diff_minus1[i] in the bitstream is equal to the value of dlt_depth_diff_threshold_array[i]; otherwise, when the value of dlt_depth_element_threshold_flag is equal to 0, the number of the bits corresponding to dlt_depth_diff_minus1[i] in the bitstream is equal to the value of dlt_depth_diff_threshold.

dlt_depth_diff_minus1_minus4[i] is the value of the difference between the ith element and the (i−1)th element in the DLT. dlt_depth_diff_minus1_minus4[i] shall be a non-negative integer value. The value of each of the other elements except the first element in the DLT is determined as: dlt_depth_value[i]=dlt_depth_diff_minus1_minus4[i]+1+4+dlt_depth_value[i−1], wherein the value of i is 1, 2, ..., num_depth_values_in_dlt−1. Coding and decoding methods for the element may be the coding and decoding methods corresponding to ue(v).

Figure 9:
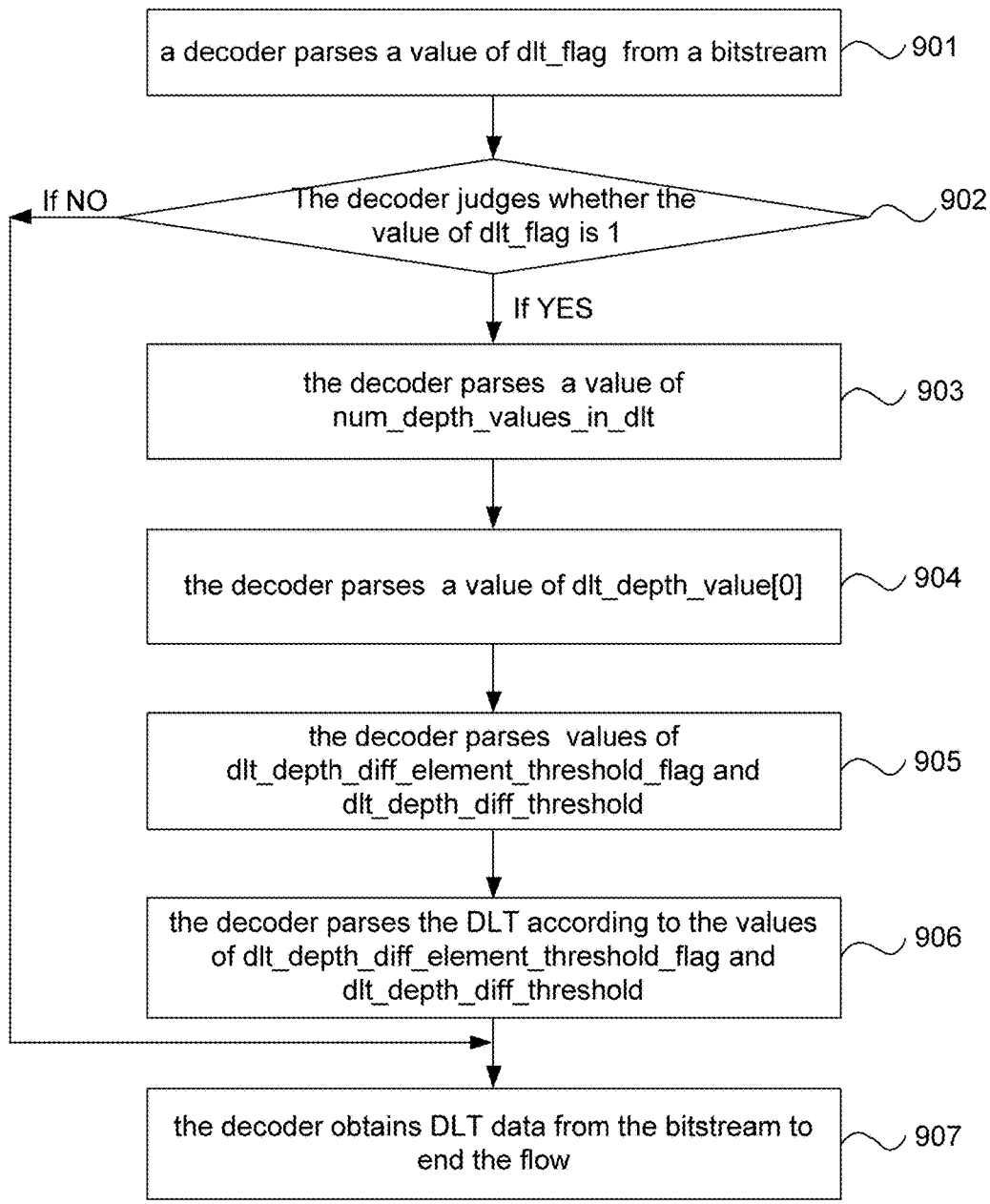
FIG. 9 is a flowchart of decoding according to embodiment 6.

As shown in FIG. 9, a decoding process employing the bitstream organization method shown in Table 5 includes the following Step 901 to 907:

Step 901: It is completely the same as Step 701.

Step 902: The decoder judges whether the value of dlt_flag is 1 or not, executes Step 903 if it is 1, otherwise executes Step 907.

Step 903: It is completely the same as Step 703.

Step 904: It is completely the same as Step 704.

Step 905: The decoder parses the values of dlt_depth_diff_element_threshold_flag and dlt_depth_diff_threshold.

The decoder parses bits corresponding to dlt_depth_diff_element_threshold_flag from the bitstream to obtain the value of dlt_depth_diff_element_threshold_flag using the decoding method corresponding to u(1).

When the decoder determines that the value of dlt_depth_diff_element_threshold_flag is equal to 1, the decoder sets the value of dlt_depth_diff_threshold to be 0.

Otherwise, when the decoder determines that the value of dlt_depth_diff_element_threshold_flag is equal to 0, the decoder parses bits corresponding to dlt_depth_diff_threshold to obtain the value of dlt_depth_diff_threshold using the decoding method corresponding to u(3).

Step 906: The decoder parses the DLT according to the values of dlt_depth_diff_element_threshold_flag and dlt_depth_diff_threshold.

If the decoder determines that the value of dlt_depth_diff_element_threshold_flag is equal to 1, the decoder parses bits corresponding to dlt_depth_diff_threshold_array[i] from the bitstream to obtain the value of dlt_depth_diff_threshold_array[i] using the decoding method corresponding to u(3); otherwise, if the decoder determines that the value of dlt_depth_diff_element_threshold_flag is equal to 0, the decoder sets the value of dlt_depth_diff_threshold_array[i] to be 0.

If the decoder determines that a value of dlt_depth_diff_threshold+dlt_depth_diff_threshold_array[i] is 0, the decoder parses bits corresponding to dlt_depth_diff_minus1[i] from the bitstream to obtain the value of dlt_depth_diff_minus1[i] using the decoding method corresponding to ue(v), and executes operation dlt_depth_value[i]=dlt_depth_diff_minus1[i]+1+dlt_depth_value[i−1].

Otherwise, if the decoder determines that the value of dlt_depth_diff_threshold+dlt_depth_diff_threshold_array[i] is greater than 0, the decoder parses the DLT according to the following flow:

the decoder parses bits corresponding to dlt_depth_diff_minus1_less_than_threshold_flag[i] from the bitstream to obtain the value of the flag dlt_depth_diff_minus1_less_than_threshold_flag[i] using the decoding method corresponding to u(1). When the value of dlt_depth_diff_minus1_less_than_threshold_flag[i] is equal to 1, the decoder parses the bits (the number of representing bits is dlt_depth_diff_threshold_array[i]) corresponding to dlt_depth_diff_minus1[i] from the bitstream to obtain the value of dlt_depth_diff_minus1[i] using the decoding method corresponding to u(v), and executes operation dlt_depth_value[i]=dlt_depth_diff_minus1[i]+1+dlt_depth_value[i−1]; otherwise, when the value of dlt_depth_diff_minus1_less_than_threshold_flag[i] is equal to 0, the decoder parses bits corresponding to dlt_depth_diff_minus1_minus4[i] from the bitstream to obtain the value of dlt_depth_diff_minus1_minus4[i] using the decoding method corresponding to ue(v), and executes operation dlt_depth_value[i]=dlt_depth_diff_minus1_minus4[i]+1+4+dlt_depth_value[i−1].

Step 907: The decoder obtains DLT data from the bitstream to end the flow, the DLT data being stored in array dlt_depth_value.

Figure 10:
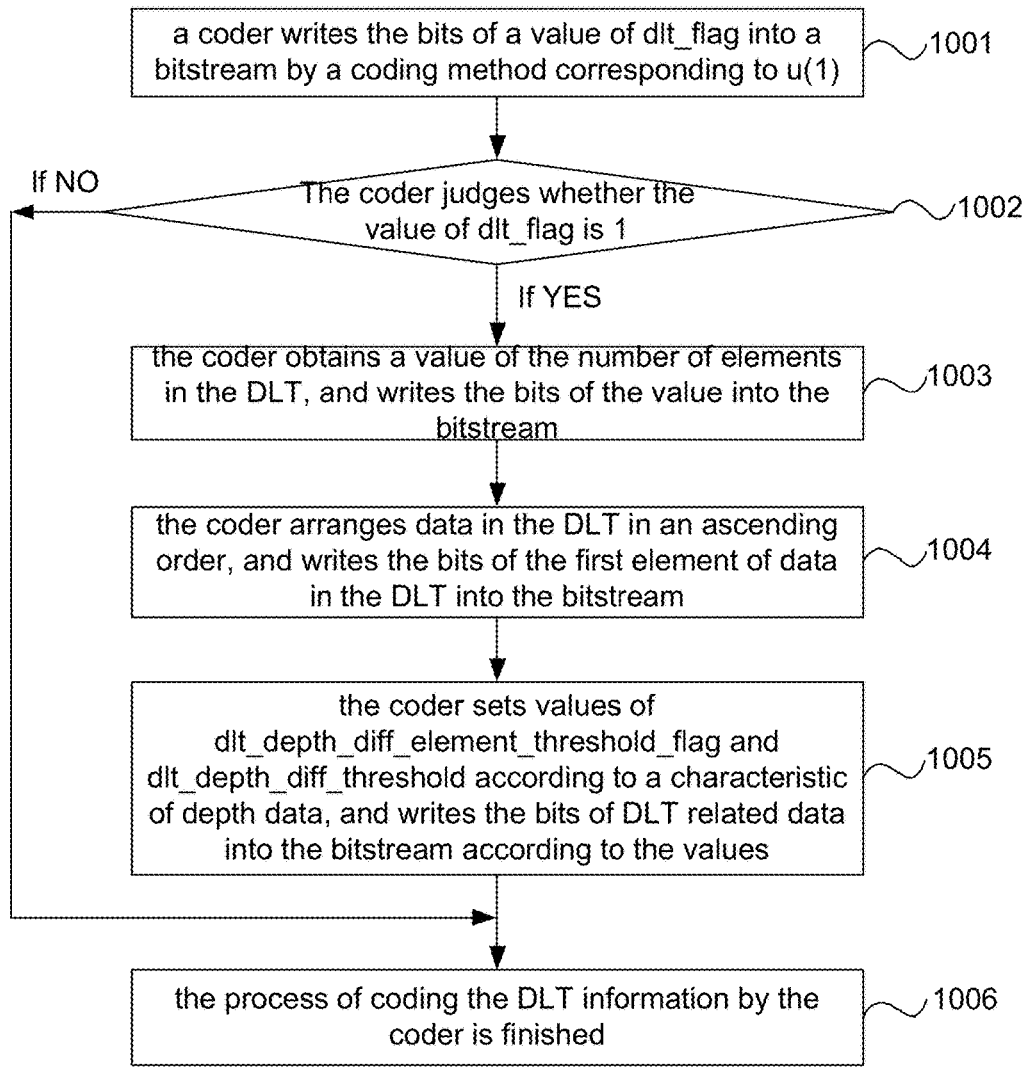
FIG. 10 is a flowchart of coding according to embodiment 6.

As shown in FIG. 10, a coding process employing the bitstream organization method shown in Table 5 includes the following Step 1001 to 1006:

Step 1001: It is completely the same as Step 801.

Step 1002: A coder judges whether the value of dlt_flag is 1 or not, executes Step 1003 if it is 1, otherwise executes Step 1006.

Step 1003: It is completely the same as Step 803.

Step 1004: It is completely the same as Step 804.

Step 1005: The coder sets the values of dlt_depth_diff_element_threshold_flag and dlt_depth_diff_threshold according to the characteristic of the depth data, and codes and writes DLT related data into the bitstream according to the values.

The coder may evaluate tradeoff between coding efficiency and occupied resources (such as calculation complexity and a requirement on a storage space) when the value of dlt_depth_diff_element_threshold_flag is set to be 0 and 1 respectively and select the value of dlt_depth_diff_element_threshold_flag with minimum cost under a set evaluation criterion (such as a common rate-distortion criterion), the specific process is as follows.

When the coder sets the value of dlt_depth_diff_element_threshold_flag to be 0, the coder evaluates tradeoff between the coding efficiency and the occupied resources (such as the calculation complexity and the requirement on the storage space) under permitted values of dlt_depth_diff_threshold respectively, and selects the value of dlt_depth_diff_threshold with minimum cost under the set evaluation criterion (such as the common rate-distortion criterion). The coder employs the cost value as the corresponding cost value when the value of dlt_depth_diff_element_threshold_flag is set to be 0, and records the value of dlt_depth_diff_threshold.

When the coder sets the value of dlt_depth_diff_element_threshold_flag to be 1, the coder evaluates tradeoff between the coding efficiency and the occupied resources (such as the calculation complexity and the requirement on the storage space) under the permitted values of dlt_depth_diff_threshold respectively, and selects the value of dlt_depth_diff_threshold_array[i] with minimum cost for the other elements except the first element in the DLT under the set evaluation criterion (such as the common rate-distortion criterion). The coder employs the cost value as the corresponding cost value when the value of dlt_depth_diff_element_threshold_flag is set to be 1, and records the values of dlt_depth_diff_threshold_array[i] of the other elements except the first element.

The coder codes and writes the value of dlt_depth_diff_element_threshold_flag into the bitstream using the coding method corresponding to u(1). If the value of dlt_depth_diff_element_threshold_flag is equal to 0, the coder codes and writes the value of dlt_depth_diff_threshold into the bitstream using the coding method corresponding to u(3).

For the other elements (such as the ith element) except the first element in the DLT, the coder executes the following operation:

when the coder determines that the value of dlt_depth_diff_element_threshold_flag is equal to 1, the coder codes and writes the determined value of dlt_depth_diff_threshold_array[i] into the bitstream using the coding method corresponding to u(3), the coder sets the threshold value according to dlt_depth_diff_threshold_array[i], and the coder sets a value of a coded bit length to be the value of dlt_depth_diff_threshold_array[i]. Otherwise, when coder determines that the value of dlt_depth_diff_element_threshold_flag is equal to 0, the coder sets the value of the coded bit length to be the value of dlt_depth_diff_threshold.

When the coder determines that a value of dlt_depth_diff_threshold+dlt_depth_diff_threshold_array[i] is equal to 0, the coder codes and writes a numerical value of dlt[i]−dlt[i−1]−1 into the bitstream using the coding method corresponding to ue(v). Otherwise, when the coder determines that the value of dlt_depth_diff_threshold+dlt_depth_diff_threshold_array[i] is greater than 0, the coder executes the following operation:

when the coder determines that the value of dlt[i]−dlt[i−1]−1 is smaller than the determined threshold value, the coder codes and writes numerical value "1" into the bitstream using the coding method corresponding to u(1), and then codes and writes the numerical value of dlt[i]−dlt[i−1]−1 into the bitstream using the coding method corresponding to u(v), the number of used bits being equal to the determined value of the coded bit length; otherwise, when the coder determines that the value of dlt[i]−dlt[i−1]−1 is greater than the threshold value, the coder codes and writes numerical value "0" into the bitstream using the coding method corresponding to u(1), and then codes and writes a numerical value of dlt[i]−dlt[i−1]−1−4 into the bitstream using the coding method corresponding to ue(v).

After the coder finishes processing processes for all the elements in the DLT, the step is ended, and Step 1006 is executed.

Step 1006: The process of coding the DLT information using the coder is finished.

Embodiment 7

Figure 11:
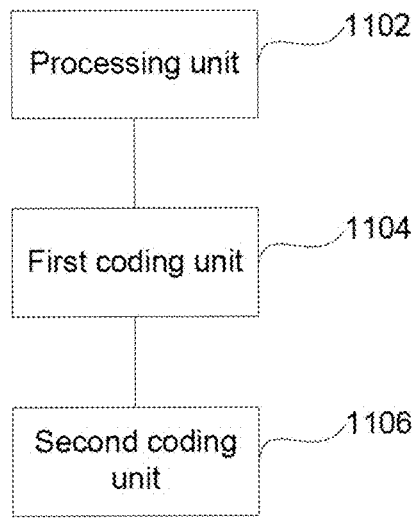
FIG. 11 is a block diagram of a device for coding depth information according to an embodiment of the present disclosure.

FIG. 11 is a block diagram of a device for coding depth information according to an embodiment of the present disclosure. The embodiment introduces a device for coding depth information, as shown in FIG. 11, which may implement the coding operation in each abovementioned embodiment, the device at least including the following parts:

a processing unit 1102, configured to arrange all elements in a DLT in an ascending order of values;

a first coding unit 1104, configured to code a value of the first element in the DLT, and write the bits of the value into a bitstream; and a second coding unit 1106, configured to code a difference value between a value of each of other elements except the first element in the DLT and a value of an element with an index number smaller than an index number of the each of other elements in the DLT, and write the bits of the difference value into the bitstream.

Specifically, the second coding unit 1106 is configured to determine the difference value between the value of each of the other elements except the first element in the DLT and the value of the element with the index number smaller than the index number of the each of other elements in the DLT, select a first entropy coding method to code the difference value when the difference value is smaller than or equal to a set threshold value, and select a second set entropy coding method to code the difference value when the difference value greater than the set threshold value.

Wherein, the set threshold value is a preset fixed value, or is a numerical value which is dynamically regulated in a coding process. The set threshold value may be set for the whole DLT, or may also be set for the other elements except the first element in the DLT respectively.

In addition, the first coding unit 1104 is further configured to write the hits of DLT information into the bitstream, wherein the DLT information includes information about the number of the elements in the DLT.

The second coding unit 1106 is configured to, when the difference value is coded, code auxiliary information and write the of the auxiliary information into the bitstream, wherein the auxiliary information is configured to identify which entropy coding method used for coding the difference value.

It is important to note that the coding device provided by the embodiment may be an independent coding device, or may also be a coder integrated in various kinds of video processing devices (including 3DV processing device). The video processing device includes a cache and a coder.

The cache caches data to be coded; and the coder arranges all the elements in the DLT in the cached data in the ascending order of the values, codes the value of the first element in the DLT, writes the bits of the value into the bitstream, codes the difference value between the value of each of other elements except the first element in the DLT and the value of the element with the index number smaller than the index number of the each of other elements in the DLT respectively, and writes the bits of the difference value into the bitstream.

Specifically, the coder determines the difference value between the value of each of other elements except the first element in the DLT and the value of the element with the index number smaller than the index number of the each of other elements in the DLT, selects the first set entropy coding method to code the difference value when the difference value is smaller than or equal to the set threshold value, and selects the second set entropy coding method to code the difference value when the difference value is greater than the set threshold value.

Wherein, the set threshold value is a preset fixed value, or is a numerical value which is dynamically regulated in a coding process.

The set threshold value is set for the whole DLT, or is set for the other elements except the first element in the DLT respectively.

In addition, the coder, when the difference value is coded, codes auxiliary information and writes the bits of the auxiliary information into the bitstream, wherein the auxiliary information is configured to identify which entropy coding method is used for coding the difference value.

Embodiment 8

Figure 12:
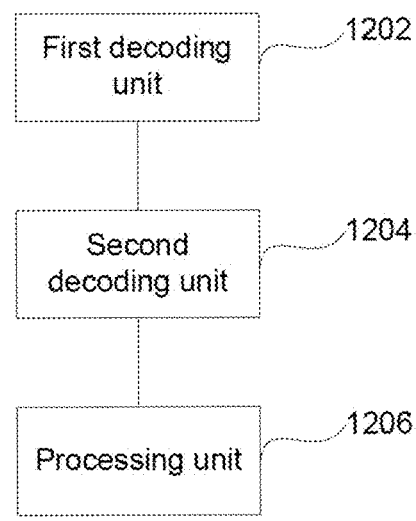
FIG. 12 is a block diagram of a device for decoding depth information according to an embodiment of the present disclosure.

FIG. 12 is a block diagram of a device for decoding depth information according to an embodiment of the present disclosure. The embodiment provides a device for decoding depth information, as shown in FIG. 12, which may implement the decoding operation in each abovementioned embodiment and at least includes the following unit:

first decoding unit 1202, configured to decode hits corresponding to a first element of a DLT in a bitstream to obtain a value of the first element, wherein, in some solutions, the first decoding unit is configured to, before the DLT is decoded, receive DLT information, the DLT information including information about the number of elements in the DLT;

a second decoding unit 1204, configured to decode bits corresponding to a difference value between a value of each of other elements except the first element the DLT and a value of an element with an index number smaller than an index number of the each of other elements to obtain the difference value.

wherein, the second decoding unit 1204 is preferably configured to, before the its corresponding to the difference value are decoded, decode bits corresponding to auxiliary information of the difference value to obtain an entropy coding method for the difference value, and decode the difference value according to an entropy decoding method corresponding to the entropy coding method for the difference value; and a processing unit 1206, configured to perform addition operation on the obtained difference value and a value of a decoded element with an index number smaller than the index number of the each of other elements corresponding to the difference value in the DLT, and employ a sum value as the value of the each of other elements with the number corresponding to the difference value in the DLT.

It is specially noted that the decoding device provided by the embodiment may be an independent decoding device, and may also be a decoder integrated in any video playing device (including a 3DV playing device).

That is, the video playing device includes a decoder, configured to decode the bits corresponding to the first element of the DLT in the received bitstream to obtain the value of the first element, decode the bits corresponding to the difference value between the value of each of the other elements except the first element in the DLT and the value of the element with the index number smaller than the index number of the each of other elements to obtain the difference value, perform addition operation on the obtained difference value and the value of the decoded element with the index number smaller than the index number of the each of other elements corresponding to the difference value in the DLT, and employ the sum value as the value of the each of other elements with the index number corresponding to the difference value in the DLT; and a display, configured to display the data decoded by the decoder.

Wherein, the decoder, before the bits corresponding to the difference value is decoded, may further decode the bits corresponding to the auxiliary information of the difference value to obtain the entropy coding method for the difference value, and decode the difference value according to the entropy decoding method corresponding to the entropy coding method for the difference value.

Those skilled in the art should understand that the embodiment of the disclosure may provide methods, systems or computer program products. Therefore, the disclosure may adopt a form of hardware embodiment, software embodiment or combined software and hardware embodiment. Moreover, the disclosure may adopt a form of computer program product implemented on one or more computer-available storage media (including, but not limited to, a disk memory and an optical memory) including computer-available program codes.

The disclosure is described with reference to the flowcharts and/or block diagrams of the methods, devices (systems) and computer program products according to the embodiments of the disclosure. It should be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor or a processor of other programmable data processing device to generate a machine, so that a device for realizing a function specified in one or more flows in the flowcharts and/or one or more blocks in the block diagrams is generated by the instructions executed through the computer or the processor of the other programmable data processing device.

These computer program instructions may also be stored in a computer-readable memory capable of guiding the computer or the other programmable data processing device to work in a specific manner, so that a product including an instruction device may be generated by the instructions stored in the computer-readable memory, the instruction device realizing the function specified in one flow or many flows in the flowcharts and/or one block or many blocks in the block diagrams.

These computer program instructions may further be loaded onto the computer or the other programmable data processing device, so that a series of operating steps are executed on the computer or the other programmable data processing device to generate processing implemented by the computer, and steps for realizing the function specified in one flow or many flows in the flowcharts and/or one block or many blocks in the block diagrams are provided by the instructions executed on the computer or the other programmable data processing device.

The above are only the preferred embodiments of the disclosure and not intended to limit the scope of protection of the disclosure. Any modifications, equivalent replacements, improvements and the like made within the spirit and principle of the disclosure shall fall within the scope of protection of the disclosure.

What is claimed is:
1. A method for coding depth information, comprising:
arranging all elements in a Depth Look-up Table (DLT), which is a data structure representing depth numerical values by index numbers, in an ascending order of values;

coding a value of a first element in the DLT, and writing bits of the value of the first element into a bitstream; and coding a difference value between a value of each of other elements except the first element in the DLT and a value of an element with an index number smaller than an index number of the each of other elements in the DLT by using an entropy coding method, and writing bits of the difference value into the bitstream, wherein the method further comprises:

before coding the difference value, coding auxiliary information, which is configured to identify which entropy coding method is used for coding the difference value, and writing bits of the auxiliary information into the bitstream;

writing bits of information of the DLT, which comprises information about the number of the elements in the DLT, into the bitstream, wherein the step of coding the difference value between the value of each of the other elements except the first element in the DLT and the value of the element with the index number smaller than the index number of the each of other elements in the DLT comprises:

determining the difference value between the value of each of the other elements except the first element in the DLT and the value of the element with the index number smaller than the index number of the each of other elements in the DLT;

selecting a first entropy coding method to code the difference value when the difference value is smaller than or equal to a set threshold value, and selecting a second entropy coding method to code the difference value when the difference value is greater than the set threshold value, wherein the set threshold value is set for the whole DLT, or is set for the other elements except the first element in the DLT respectively.

2. The method according to claim 1, wherein the set threshold value is a preset fixed value, or is a numerical value which is dynamically regulated in a coding process.

3. A method for decoding depth information, comprising:

decoding bits corresponding to a first element of a Depth Look-up Table (DLT), which is a data structure representing depth numerical values by index numbers, in a bitstream to obtain a value of the first element;

decoding bits corresponding to a difference value between a value of each of other elements except the first element in the DLT and a value of an element with an index number smaller than an index number of the each of other elements to obtain the difference value; and performing addition operation on the obtained difference value and a value of a decoded element with an index number smaller than the index number of the each of other elements corresponding to the difference value in the DLT, and employing a sum value as the value of the each of other elements with the index number corresponding to the difference value in the DLT, wherein the method further comprises:

before the bits corresponding to the difference value are decoded, decoding bits corresponding to auxiliary information of the difference value to identify an entropy coding method for the difference value, and decoding the difference value according to an entropy decoding method corresponding to the entropy coding method for the difference value;

before the DLT is decoded, decoding information of the DLT which comprises information about the number of the elements in the DLT, the difference value is coded by a first entropy coding method when the difference value is smaller than or equal to a set threshold value, and the different value is coded by a second entropy coding method when the difference value is greater than the set threshold value, wherein the set threshold value is set for the whole DLT, or is set for the other elements except the first element in the DLT respectively.

4. A device for coding depth information, comprising:

a processing unit, configured to arrange all elements in a Depth Look-up Table (DLT) in an ascending order of values;

a first coding unit, configured to code a value of a first element in the DLT, which is a data structure representing depth numerical values by index numbers, and write bits of the value of the first element into a bitstream; and a second coding unit, configured to code a difference value between a value of each of other elements except the first element in the DLT and a value of an element with an index number smaller than an index number of the each of other elements in the DLT by using an entropy coding method, and write bits of the difference value into the bitstream, wherein the second coding unit is configured to, before the difference value is coded, code auxiliary information, which is configured to identify which entropy coding method is used for coding the difference value, and write bits of the auxiliary information into the bitstream;

the first coding unit is further configured to write bits of information of the DLT, which comprises information about the number of the elements in the DLT, into the bitstream, wherein the second coding unit is configured to determine the difference value between the value of each of the other elements except the first element in the DLT and the value of the element with the index number smaller than the index number of the each of other elements in the DLT, select a first entropy coding method to code the difference value when the difference value is smaller than or equal to a set threshold value, and select a second entropy coding method to code the difference value when the difference value is greater than the set threshold value, wherein the set threshold value is set for the whole DLT, or is set for the other elements except the first element in the DLT respectively.

5. The device according to claim 4, wherein the set threshold value is a preset fixed value, or is a numerical value which is dynamically regulated in a coding process.

6. A device for decoding depth information, comprising:

a first decoding unit, configured to decode bits corresponding to a first element of a Depth Look-up Table (DLT), which is a data structure representing depth numerical values by index numbers, in a bitstream to obtain a value of the first element;

a second decoding unit, configured to decode bits corresponding to a difference value between a value of each of other elements except the first element in the DLT and a value of an element with an index number smaller than an index number of the each of other elements to obtain the difference value; and a processing unit, configured to perform addition operation on the obtained difference value and a value of a decoded element with an index number smaller than the index number of the each of other elements corresponding to the difference value in the DLT, and employ a sum value as the value of the each of other elements with the index number corresponding to the difference value in the DLT, and wherein the second decoding unit is configured to, before the bits corresponding to the difference value are decoded, decode bits corresponding to auxiliary information of the difference value to identify an entropy coding method for the difference value, and decode the difference value according to an entropy decoding method corresponding to the entropy coding method for the difference value;

the first decoding unit is configured to, before the DLT is decoded, decode information of the DLT which comprises information about the number of the elements in the DLT, the difference value is coded by a first entropy coding method when the difference value is smaller than or equal to a set threshold value, and the difference value is coded by a second entropy coding method when the difference value is greater than the set threshold value, wherein the set threshold value is set for the whole DLT, or is set for the other elements except the first element in the DLT respectively.

* * * * *